US011312491B2

(12) United States Patent
Morris et al.

(10) Patent No.: US 11,312,491 B2
(45) Date of Patent: Apr. 26, 2022

(54) CONVERTIBLE BIPLANE AIRCRAFT FOR AUTONOMOUS CARGO DELIVERY

(71) Applicant: Textron Innovations Inc., Providence, RI (US)

(72) Inventors: Kevin Morris, Hawkesbury (CA); Nicholas Brodeur, Beaconsfield (CA); Pascal Flynn-Robitaille, Laval (CA); Mathieu Beland, Mirabel (CA)

(73) Assignee: Textron Innovations Inc., Providence, RI (US)

( * ) Notice: Subject to any disclaimer, the term of this patent is extended or adjusted under 35 U.S.C. 154(b) by 112 days.

(21) Appl. No.: 17/005,704

(22) Filed: Aug. 28, 2020

(65) Prior Publication Data

US 2021/0122468 A1 Apr. 29, 2021

Related U.S. Application Data

(63) Continuation-in-part of application No. 16/661,740, filed on Oct. 23, 2019, now Pat. No. 11,235,856.

(51) Int. Cl.
*B64C 29/02* (2006.01)
*B64D 1/10* (2006.01)
(Continued)

(52) U.S. Cl.
CPC ............. *B64D 1/10* (2013.01); *B64C 1/0009* (2013.01); *B64C 1/1415* (2013.01); *B64C 1/22* (2013.01);
(Continued)

(58) Field of Classification Search
CPC .......... B64D 1/10; B64D 27/24; B64D 41/00; B64C 1/0009; B64C 1/1415; B64C 1/22;
(Continued)

(56) References Cited

U.S. PATENT DOCUMENTS 1,655,113 A 1/1928 Nikola
2,601,090 A 6/1952 James
(Continued)

FOREIGN PATENT DOCUMENTS

CN 105539833 A 5/2016
FR 2977865 A3 1/2013
(Continued)

OTHER PUBLICATIONS

Air Launched Unmanned Disaster Relief Delivery Vehicle, 33rd Annual AHS Student Design Competition, University of Maryland, Undated but admitted prior art.
(Continued)

*Primary Examiner* — Justin M Benedik
(74) *Attorney, Agent, or Firm* — Lawrence Youst PLLC

(57) ABSTRACT

An autonomous cargo delivery aircraft operable to transition between thrust-borne lift in a VTOL orientation and wing-borne lift in a biplane orientation. The aircraft includes a fuselage having an aerodynamic shape with a leading edge, a trailing edge and first and second sides. First and second wings are coupled to the fuselage proximate the first and second sides, respectively. A distributed thrust array includes a first pair of propulsion assemblies coupled to the first wing and a second pair of propulsion assemblies coupled to the second wing. A flight control system is operably associated with the distributed thrust array and configured to independently control each of the propulsion assemblies. The first side of the fuselage includes a door configured to provide access to a cargo bay disposed within the fuselage from an exterior of the aircraft with a predetermined clearance relative to the first pair of propulsion assemblies.

20 Claims, 12 Drawing Sheets

(51) Int. Cl.
  *B64C 39/08* (2006.01)
  *B64C 1/00* (2006.01)
  *B64C 1/22* (2006.01)
  *B64C 1/14* (2006.01)
  *B64D 27/24* (2006.01)
  *B64C 39/02* (2006.01)
  *B64D 41/00* (2006.01)
  *G05D 1/10* (2006.01)
  *E05F 15/00* (2015.01)

(52) U.S. Cl.
  CPC ............ *B64C 29/02* (2013.01); *B64C 39/024* (2013.01); *B64C 39/08* (2013.01); *B64D 27/24* (2013.01); *B64D 41/00* (2013.01); *E05F 15/00* (2013.01); *G05D 1/102* (2013.01); *B64C 2201/02* (2013.01); *B64C 2201/042* (2013.01); *B64C 2201/108* (2013.01); *B64C 2201/128* (2013.01); *B64C 2201/141* (2013.01); *E05Y 2201/422* (2013.01); *E05Y 2900/502* (2013.01)

(58) Field of Classification Search
  CPC ..... B64C 29/02; B64C 39/08; B64C 2201/02; B64C 2201/042; B64C 2201/108; B64C 2201/128; B64C 2201/141; E05F 15/00; G05D 1/102
  See application file for complete search history.

(56) References Cited

U.S. PATENT DOCUMENTS

| | | | |
|---|---|---|---|
| 2,655,997 A | 10/1953 | Peterson | |
| 2,688,843 A | 9/1954 | Pitt | |
| 3,002,712 A | 10/1961 | Sterling | |
| 3,081,964 A * | 3/1963 | Quenzler | B64C 29/0033 244/54 |
| 3,181,810 A | 5/1965 | Olson | |
| 3,259,343 A | 7/1966 | Roppel | |
| 3,289,980 A | 12/1966 | Gardner | |
| 3,350,035 A * | 10/1967 | Schlieben | B64C 29/02 244/7 R |
| 3,592,412 A | 7/1971 | Glatfelter | |
| 3,618,875 A | 11/1971 | Kappus | |
| 3,783,618 A | 1/1974 | Kawamura | |
| 3,916,588 A | 11/1975 | Magill | |
| 4,243,358 A | 1/1981 | Carlock et al. | |
| 4,458,864 A | 7/1984 | Colombo et al. | |
| 4,571,157 A | 2/1986 | Eickmann | |
| 4,596,368 A | 6/1986 | Schmittle | |
| 4,613,098 A | 9/1986 | Eickmann | |
| 4,741,672 A | 5/1988 | Breuner | |
| 4,771,967 A | 9/1988 | Geldbaugh | |
| 4,913,377 A | 4/1990 | Eickmann | |
| 4,925,131 A | 5/1990 | Eickmann | |
| 5,131,605 A | 7/1992 | Kress | |
| 5,188,512 A | 2/1993 | Thornton | |
| 5,592,894 A | 1/1997 | Johnson | |
| 5,842,667 A | 12/1998 | Jones | |
| 6,086,015 A | 7/2000 | MacCready | |
| 6,170,778 B1 | 1/2001 | Cycon et al. | |
| 6,260,793 B1 | 7/2001 | Balayn et al. | |
| 6,270,038 B1 | 8/2001 | Cycon et al. | |
| 6,402,088 B1 | 6/2002 | Syrovy et al. | |
| 6,655,631 B2 | 12/2003 | Austen-Brown | |
| 6,845,939 B1 | 1/2005 | Baldwin | |
| 6,886,776 B2 | 5/2005 | Wagner et al. | |
| 6,892,980 B2 | 5/2005 | Kawai | |
| 7,059,562 B2 | 6/2006 | Baldwin | |
| 7,150,429 B2 | 12/2006 | Kusic | |
| 7,210,654 B1 | 5/2007 | Cox et al. | |
| 7,465,236 B2 | 12/2008 | Wagels | |
| 7,472,863 B2 | 1/2009 | Pak | |
| 7,555,893 B2 | 7/2009 | Okai et al. | |
| D598,838 S * | 8/2009 | Carr | D12/319 |
| 7,984,684 B2 | 7/2011 | Hinderks | |
| 8,152,096 B2 | 4/2012 | Smith | |
| 8,393,564 B2 | 3/2013 | Kroo | |
| 8,505,846 B1 | 8/2013 | Sanders | |
| 8,602,348 B2 | 12/2013 | Bryant | |
| 8,646,720 B2 | 2/2014 | Shaw | |
| 8,733,690 B2 | 5/2014 | Bevirt et al. | |
| 8,800,912 B2 | 8/2014 | Oliver | |
| 8,820,672 B2 | 9/2014 | Erben et al. | |
| 8,833,692 B2 | 9/2014 | Yoeli | |
| 8,909,391 B1 | 12/2014 | Peeters et al. | |
| 8,948,935 B1 | 2/2015 | Peeters et al. | |
| 9,022,312 B2 | 5/2015 | Kosheleff | |
| 9,045,226 B2 | 6/2015 | Piasecki et al. | |
| 9,087,451 B1 | 7/2015 | Jarrell | |
| 9,108,744 B2 | 8/2015 | Takeuchi | |
| 9,109,575 B2 | 8/2015 | Weddendorf et al. | |
| 9,120,560 B1 | 9/2015 | Armer et al. | |
| 9,127,908 B2 | 9/2015 | Miralles | |
| 9,162,753 B1 | 10/2015 | Panto et al. | |
| 9,187,174 B2 | 11/2015 | Shaw | |
| 9,193,460 B2 | 11/2015 | Laudrain | |
| 9,221,538 B2 | 12/2015 | Takahashi et al. | |
| 9,242,714 B2 | 1/2016 | Wang et al. | |
| 9,254,916 B2 | 2/2016 | Yang | |
| 9,284,049 B1 | 3/2016 | Wang et al. | |
| 9,321,530 B2 | 4/2016 | Wang et al. | |
| 9,376,208 B1 | 6/2016 | Gentry | |
| 9,388,794 B2 | 7/2016 | Weddendorf et al. | |
| 9,403,593 B2 | 8/2016 | Downey et al. | |
| 9,440,736 B2 | 9/2016 | Bitar | |
| 9,463,875 B2 | 10/2016 | Abuelsaad et al. | |
| 9,493,225 B2 | 11/2016 | Wang et al. | |
| 9,610,817 B1 | 4/2017 | Piasecki et al. | |
| 9,643,720 B2 | 5/2017 | Hesselbarth | |
| 9,694,908 B2 | 7/2017 | Razroev | |
| 9,694,911 B2 | 7/2017 | Bevirt et al. | |
| 9,714,087 B2 | 7/2017 | Matsuda | |
| 9,798,322 B2 | 10/2017 | Bachrach et al. | |
| 9,800,091 B2 | 10/2017 | Nugent, Jr. et al. | |
| 9,821,909 B2 | 11/2017 | Moshe | |
| 9,963,228 B2 | 5/2018 | McCullough et al. | |
| 9,994,313 B2 | 6/2018 | Claridge et al. | |
| 10,011,351 B2 | 7/2018 | McCullough et al. | |
| 10,124,890 B2 | 11/2018 | Sada-Salinas et al. | |
| 10,183,746 B2 | 1/2019 | McCullough et al. | |
| 10,214,285 B2 | 2/2019 | McCullough et al. | |
| 10,220,944 B2 | 3/2019 | McCullough et al. | |
| 10,227,133 B2 | 3/2019 | McCullough et al. | |
| 10,232,950 B2 | 3/2019 | McCullough et al. | |
| 10,301,016 B1 | 5/2019 | Bondarev et al. | |
| 10,322,799 B2 | 6/2019 | McCullough et al. | |
| 2002/0100834 A1 | 8/2002 | Baldwin | |
| 2002/0100835 A1 | 8/2002 | Kusic | |
| 2003/0062443 A1 | 4/2003 | Wagner et al. | |
| 2004/0245374 A1 | 12/2004 | Morgan | |
| 2005/0045765 A1 * | 3/2005 | Pitt | B64C 3/42 244/46 |
| 2006/0091258 A1 | 5/2006 | Chiu et al. | |
| 2006/0266881 A1 | 11/2006 | Hughey | |
| 2007/0212224 A1 | 9/2007 | Podgurski | |
| 2007/0221780 A1 | 9/2007 | Builta | |
| 2009/0008499 A1 | 1/2009 | Shaw | |
| 2010/0051755 A1 * | 3/2010 | Nichols | B64C 39/08 244/45 R |
| 2010/0147993 A1 | 6/2010 | Annati et al. | |
| 2010/0193644 A1 | 8/2010 | Karem | |
| 2010/0295321 A1 | 11/2010 | Bevirt | |
| 2011/0001001 A1 | 1/2011 | Bryant | |
| 2011/0042508 A1 | 2/2011 | Bevirt | |
| 2011/0042509 A1 | 2/2011 | Bevirt et al. | |
| 2011/0057453 A1 | 3/2011 | Roberts | |
| 2011/0121570 A1 | 5/2011 | Bevirt et al. | |
| 2011/0315806 A1 | 12/2011 | Piasecki et al. | |
| 2012/0209456 A1 | 8/2012 | Harmon et al. | |
| 2012/0234968 A1 | 9/2012 | Smith | |
| 2013/0020429 A1 | 1/2013 | Kroo | |
| 2013/0175404 A1 | 7/2013 | Shefer | |
| 2013/0341458 A1 | 12/2013 | Sutton et al. | |

(56) References Cited

U.S. PATENT DOCUMENTS

| | | |
|---|---|---|
| 2014/0018979 A1 | 1/2014 | Goossen et al. |
| 2014/0097290 A1* | 4/2014 | Leng .................. B64D 33/08 244/6 |
| 2014/0339372 A1 | 11/2014 | Dekel et al. |
| 2015/0012154 A1 | 1/2015 | Senkel et al. |
| 2015/0014475 A1 | 1/2015 | Taylor et al. |
| 2015/0136897 A1 | 5/2015 | Seibel et al. |
| 2015/0284079 A1 | 10/2015 | Matsuda |
| 2015/0285165 A1 | 10/2015 | Steinwandel et al. |
| 2015/0298788 A1* | 10/2015 | Wang .................... B64C 1/061 244/17.23 |
| 2016/0068265 A1 | 3/2016 | Hoareau et al. |
| 2016/0180717 A1 | 6/2016 | Ubhi et al. |
| 2016/0214712 A1 | 7/2016 | Fisher et al. |
| 2017/0008627 A1 | 1/2017 | Soto et al. |
| 2017/0021924 A1 | 1/2017 | Kubik et al. |
| 2017/0066531 A1 | 3/2017 | McAdoo |
| 2017/0097644 A1 | 4/2017 | Fegely et al. |
| 2017/0144746 A1 | 5/2017 | Schank et al. |
| 2017/0158312 A1 | 6/2017 | Alber et al. |
| 2017/0174342 A1 | 6/2017 | Huang |
| 2017/0240274 A1 | 8/2017 | Regev |
| 2017/0297699 A1 | 10/2017 | Alber et al. |
| 2017/0327219 A1 | 11/2017 | Alber |
| 2017/0334557 A1 | 11/2017 | Alber et al. |
| 2018/0002011 A1 | 1/2018 | McCullough et al. |
| 2018/0002012 A1 | 1/2018 | McCullough et al. |
| 2018/0002013 A1 | 1/2018 | McCullough et al. |
| 2018/0002014 A1 | 1/2018 | McCullough et al. |
| 2018/0002015 A1 | 1/2018 | McCullough et al. |
| 2018/0002016 A1 | 1/2018 | McCullough et al. |
| 2018/0002026 A1* | 1/2018 | Oldroyd .................. B64C 11/46 |
| 2018/0002027 A1 | 1/2018 | McCullough et al. |
| 2018/0022467 A1 | 1/2018 | Alber |
| 2018/0044011 A1 | 2/2018 | Reichert |
| 2018/0244377 A1 | 8/2018 | Chan |
| 2018/0244383 A1 | 8/2018 | Valente et al. |
| 2018/0257761 A1* | 9/2018 | Oldroyd .................. B64C 29/02 |
| 2018/0265193 A1 | 9/2018 | Gibboney et al. |
| 2018/0273160 A1 | 9/2018 | Baldwin et al. |
| 2018/0327092 A1 | 11/2018 | Deng et al. |
| 2018/0362158 A1 | 12/2018 | Zhang et al. |
| 2019/0031331 A1 | 1/2019 | McCullough et al. |
| 2019/0031334 A1 | 1/2019 | McCullough et al. |
| 2019/0031335 A1 | 1/2019 | McCullough et al. |
| 2019/0031336 A1 | 1/2019 | McCullough et al. |
| 2019/0031337 A1 | 1/2019 | McCullough et al. |
| 2019/0031338 A1 | 1/2019 | McCullough et al. |
| 2019/0031339 A1 | 1/2019 | McCullough et al. |
| 2019/0031361 A1 | 1/2019 | McCullough et al. |
| 2019/0144108 A1 | 5/2019 | McCullough et al. |
| 2019/0263516 A1 | 8/2019 | McCullough et al. |
| 2019/0389573 A1 | 12/2019 | Kahou et al. |

FOREIGN PATENT DOCUMENTS

| | | | |
|---|---|---|---|
| GB | 587388 | A | 4/1947 |
| GB | 618475 | A | 2/1949 |
| GB | 654089 | A | 6/1951 |
| WO | 2001074659 | A1 | 10/2001 |
| WO | 2005039973 | A2 | 5/2005 |
| WO | 2014067563 | A1 | 5/2014 |

OTHER PUBLICATIONS

Bell and NASA Partner for UAV Development; Transportup.com; Sep. 9, 2018.
Bell APT—Automatic Pod Transport; SUASNEWS.com; Dec. 6, 2017.
Bell Autonomous Pod Transport; MONCH.com; May 2, 2018.
Wolfe, Frank; Bell Moving to Scale Up Antonymous Delivery Drones for US Military; Rotor & Wing International; Sep. 27, 2018.
Canadian Examination Report; OIPC; dated Dec. 24, 2021.

* cited by examiner

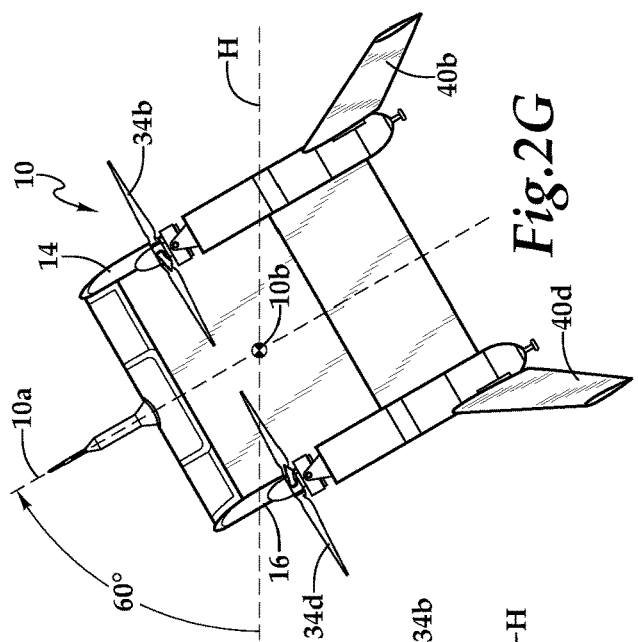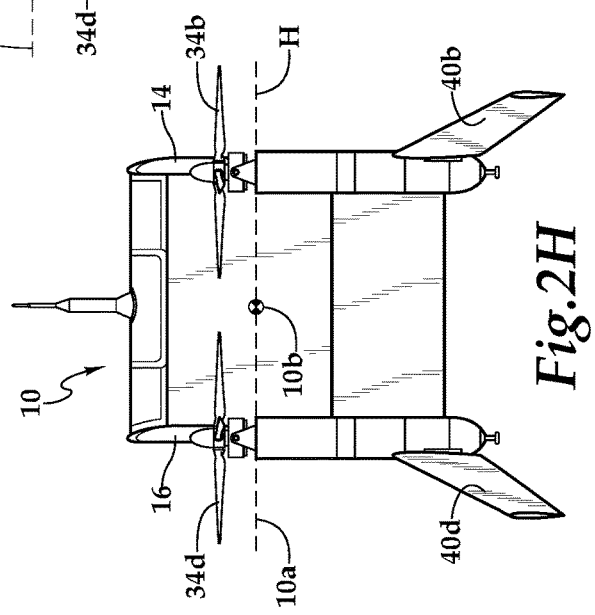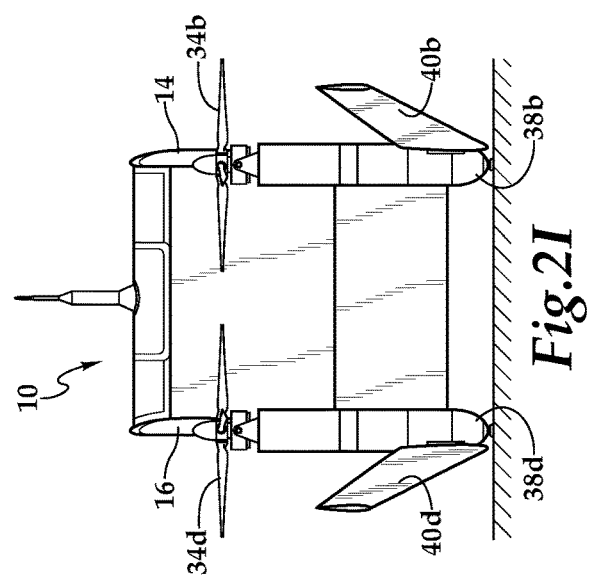

CONVERTIBLE BIPLANE AIRCRAFT FOR AUTONOMOUS CARGO DELIVERY

CROSS-REFERENCE TO RELATED APPLICATIONS

The present application is a continuation-in-part of co-pending application Ser. No. 16/661,740 filed Oct. 23, 2019, the entire contents of which is hereby incorporated by reference.

TECHNICAL FIELD OF THE DISCLOSURE

The present disclosure relates, in general, to aircraft configured to convert between thrust-borne lift in a VTOL orientation and wing-borne lift in a biplane orientation and, in particular, to aircraft operable for autonomous cargo delivery.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the airplane in flight. Fixed-wing aircraft, however, typically require a runway that is hundreds or thousands of feet long for takeoff and landing. Unlike fixed-wing aircraft, vertical takeoff and landing (VTOL) aircraft do not require runways. Instead, VTOL aircraft are capable of taking off, hovering and landing vertically. One example of VTOL aircraft is a helicopter which is a rotorcraft having one or more rotors that provide lift and thrust to the aircraft. The rotors not only enable hovering and vertical takeoff and landing, but also enable, forward, backward and lateral flight. These attributes make helicopters highly versatile for use in congested, isolated or remote areas where fixed-wing aircraft may be unable to take off and land. Helicopters, however, typically lack the forward airspeed of fixed-wing aircraft.

A tiltrotor aircraft is another example of a VTOL aircraft. Tiltrotor aircraft generate lift and propulsion using proprotors that are typically coupled to nacelles mounted near the ends of a fixed wing. The nacelles rotate relative to the fixed wing such that the proprotors have a generally horizontal plane of rotation for vertical takeoff, hovering and landing and a generally vertical plane of rotation for forward flight, wherein the fixed wing provides lift and the proprotors provide forward thrust. In this manner, tiltrotor aircraft combine the vertical lift capability of a helicopter with the speed and range of fixed-wing aircraft. Tiltrotor aircraft, however, typically suffer from downwash inefficiencies during vertical takeoff and landing due to interference caused by the fixed wing. A further example of a VTOL aircraft is a tiltwing aircraft that features a rotatable wing that is generally horizontal for forward flight and rotates to a generally vertical orientation for vertical takeoff and landing. Propellers are coupled to the rotating wing to provide the required vertical thrust for takeoff and landing and the required forward thrust to generate lift from the wing during forward flight. The tiltwing design enables the slipstream from the propellers to strike the wing on its smallest dimension, thus improving vertical thrust efficiency as compared to tiltrotor aircraft. Tiltwing aircraft, however, are more difficult to control during hover as the vertically tilted wing provides a large surface area for crosswinds typically requiring tiltwing aircraft to have either cyclic rotor control or an additional thrust station to generate a moment.

SUMMARY

In a first aspect, the present disclosure is directed to an aircraft operable to transition between thrust-borne lift in a VTOL orientation and wing-borne lift in a biplane orientation. The aircraft includes a fuselage having an aerodynamic shape with a leading edge and a trailing edge separated by a chord length and first and second sides separated by a span length. The fuselage having a first cargo bay. First and second wings are coupled to the fuselage proximate the first and second sides, respectively. A distributed thrust array includes a first pair of propulsion assemblies coupled to the first wing and a second pair of propulsion assemblies coupled to the second wing. A flight control system is operably associated with the distributed thrust array and configured to independently control each of the propulsion assemblies. The first side of the fuselage includes a first door configured to provide access to the first cargo bay from an exterior of the aircraft with a predetermined clearance relative to each of the propulsion assemblies of the first pair of propulsion assemblies.

In some embodiments, in the VTOL orientation, the first wing may be substantially forward of the fuselage and the second wing may be substantially aft of the fuselage. In such embodiment, in the biplane orientation, the first wing may be substantially below the fuselage and the second wing may be substantially above the fuselage. In certain embodiments, the first and second wings may be substantially parallel to each other. In some embodiments, the first and second wings may be swept wings. In such embodiments, each of the first and second wings may have an apex proximate the leading edge of the fuselage such that, in the VTOL orientation, the propulsion assemblies are below the apexes of the first and second wings and such that, in the biplane orientation, the propulsion assemblies are aft of the apexes of the first and second wings. In certain embodiments, in the VTOL orientation, the propulsion assemblies may be below the leading edge of the fuselage and, in the biplane orientation, the propulsion assemblies may be aft of the leading edge of the fuselage.

In some embodiments, the fuselage may have a second cargo bay and the first side of the fuselage may include a second door configured to provide access to the second cargo bay from the exterior of the aircraft with the predetermined clearance relative to each of the propulsion assemblies of the first pair of propulsion assemblies. In certain embodiments, a power system may be disposed within the fuselage such as a plurality of batteries. In some embodiments, each of the propulsion assemblies may include an electric motor and a rotor assembly coupled to the electric motor. In certain embodiments, the distributed thrust array may be a two-dimensional thrust array. In some embodiments, the flight control system may be configured for autonomous flight control and/or unmanned cargo delivery.

In certain embodiments, in the biplane orientation, the first door may be configured for cargo drop operations. In such embodiments, a first door actuator may be configured to receive commands from the flight control system and operate the first door between open and closed positions during the cargo drop operations. In some embodiments, in the VTOL orientation, a trailing edge door may be configured for cargo drop operations. In such embodiments, a trailing edge door actuator may be configured to receive commands from the flight control system and operate the trailing edge door between open and closed positions during the cargo drop operations.

In a second aspect, the present disclosure is directed to an autonomous cargo delivery aircraft operable to transition between thrust-borne lift in a VTOL orientation and wing-borne lift in a biplane orientation. The aircraft includes a fuselage having an aerodynamic shape with a leading edge and a trailing edge separated by a chord length and first and second sides separated by a span length. The fuselage having a first cargo bay. First and second swept wings are coupled to the fuselage proximate the first and second sides, respectively. A distributed thrust array includes a first pair of propulsion assemblies coupled to the first swept wing and a second pair of propulsion assemblies coupled to the second swept wing. A flight control system is operably associated with the distributed thrust array and configured to independently control each of the propulsion assemblies. The first side of the fuselage includes a first door configured to provide access to the first cargo bay from an exterior of the aircraft with a predetermined clearance relative to each of the propulsion assemblies of the first pair of propulsion assemblies. In the VTOL orientation, the first swept wing is substantially forward of the fuselage, the second swept wing is substantially aft of the fuselage and the propulsion assemblies are below the leading edge of the fuselage. In the biplane orientation, the first swept wing is substantially below the fuselage, the second swept wing is substantially above the fuselage, the propulsion assemblies are aft of the leading edge of the fuselage and the first door is configured for cargo drop operations.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 2A-2I are schematic illustrations of the autonomous cargo delivery aircraft of FIG. 1 in a sequential flight operating scenario in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Figure 1B:
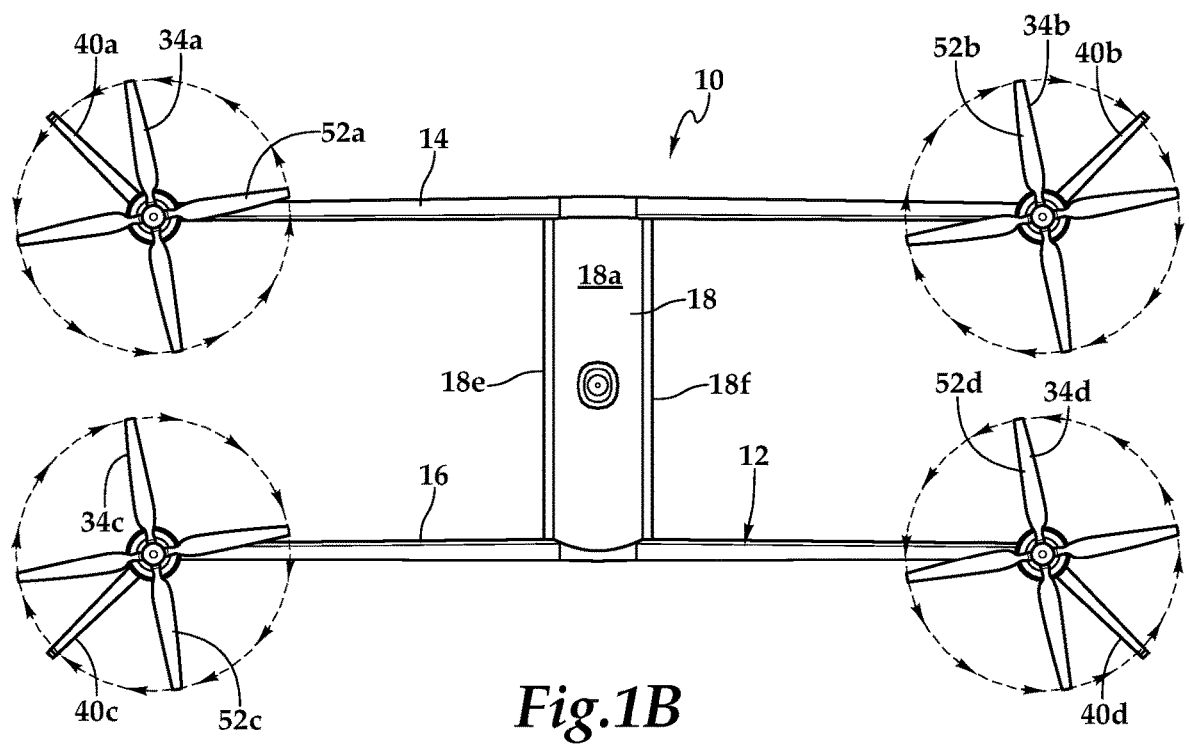
FIGS. 1A-1G are schematic illustrations of an autonomous cargo delivery aircraft operable to convert between thrust-borne lift in a VTOL orientation and wing-borne lift in a biplane orientation in accordance with embodiments of the present disclosure.
Figure 1A:
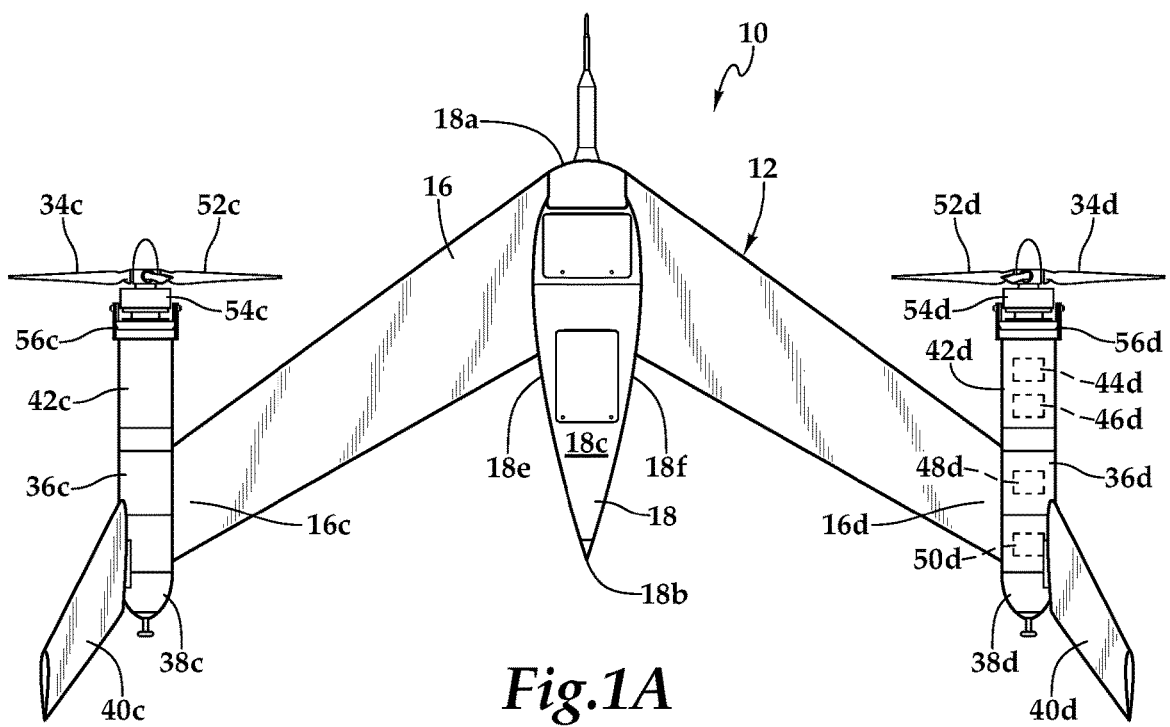
Figure 1D:
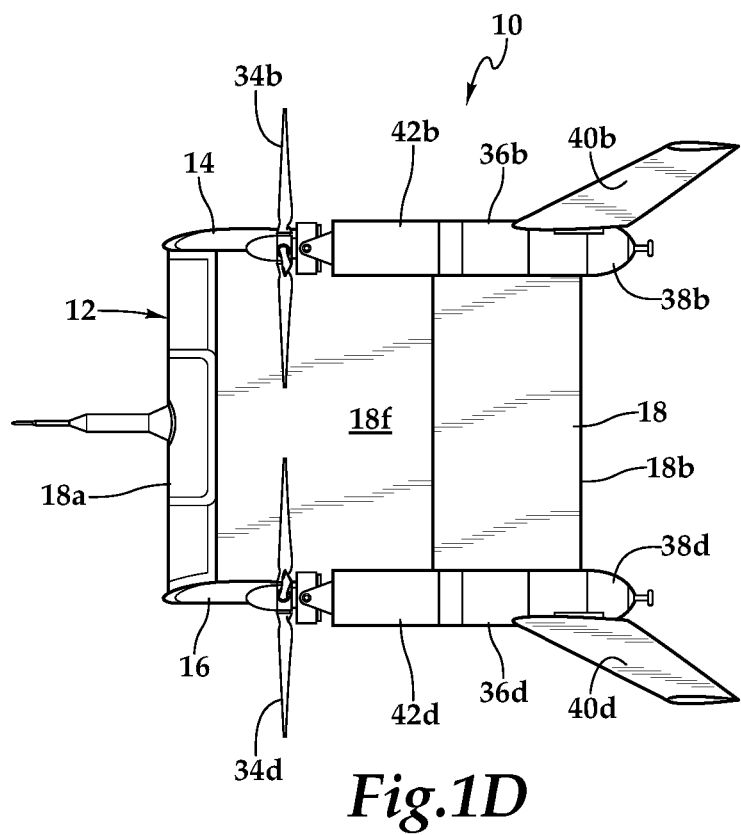
Figure 1C:
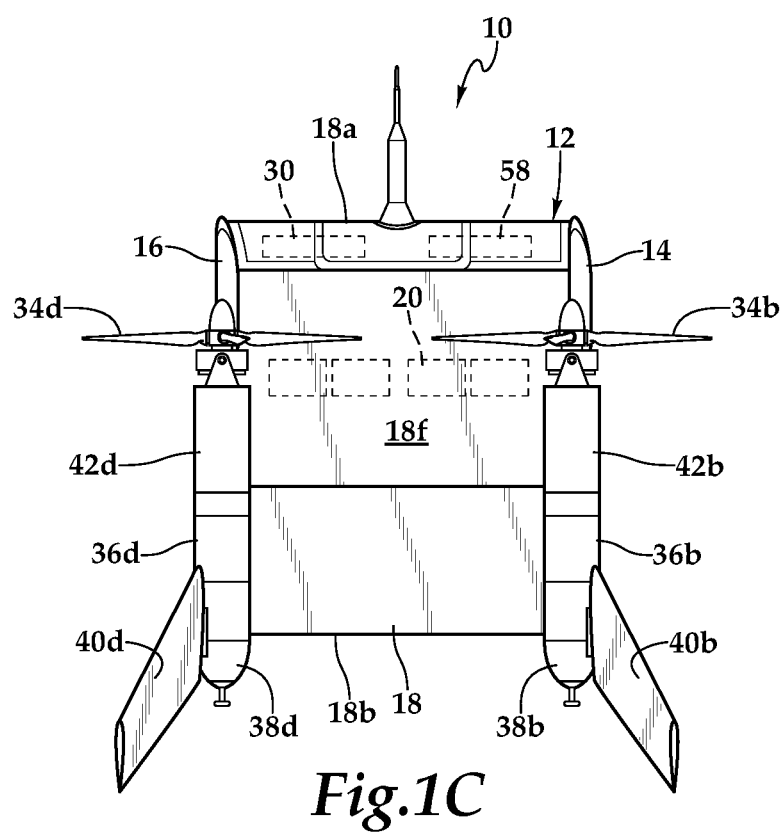
Figure 1F:
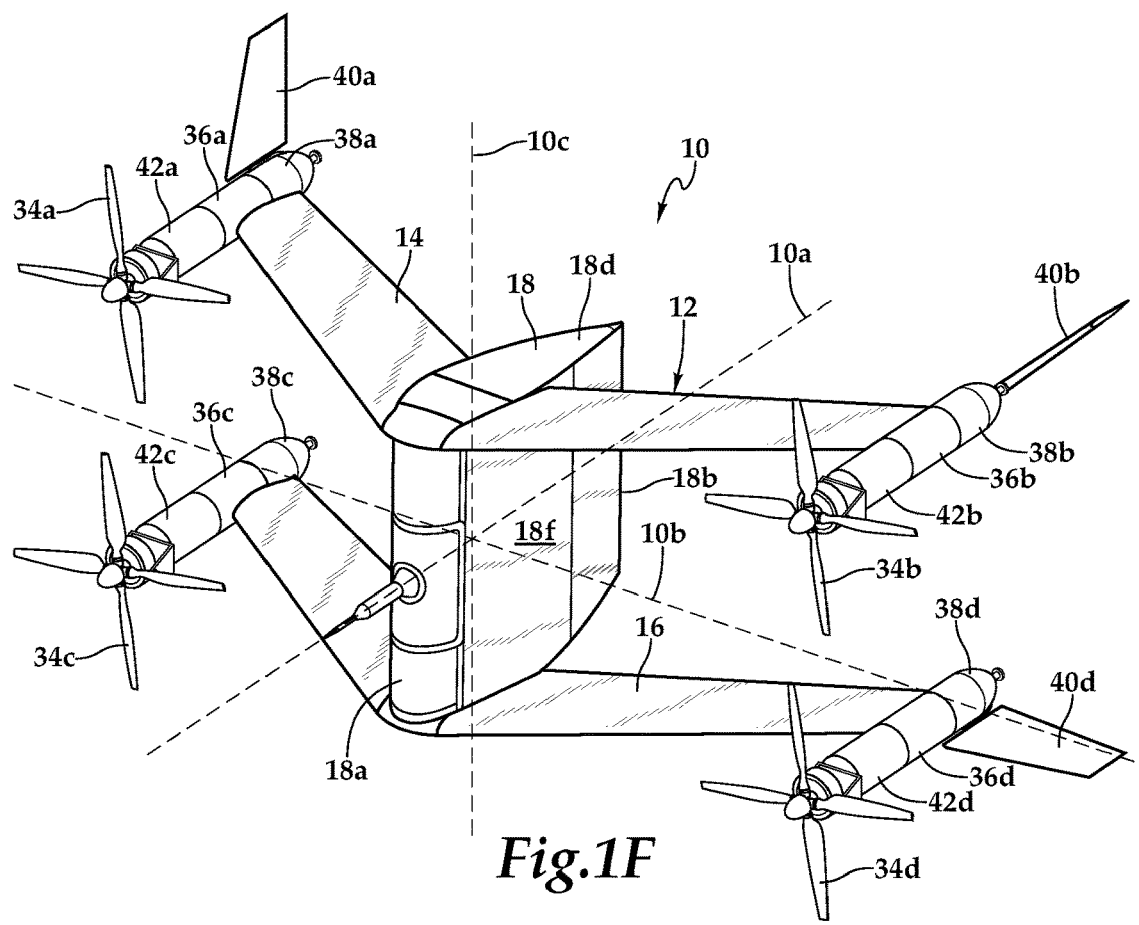
Figure 1E:
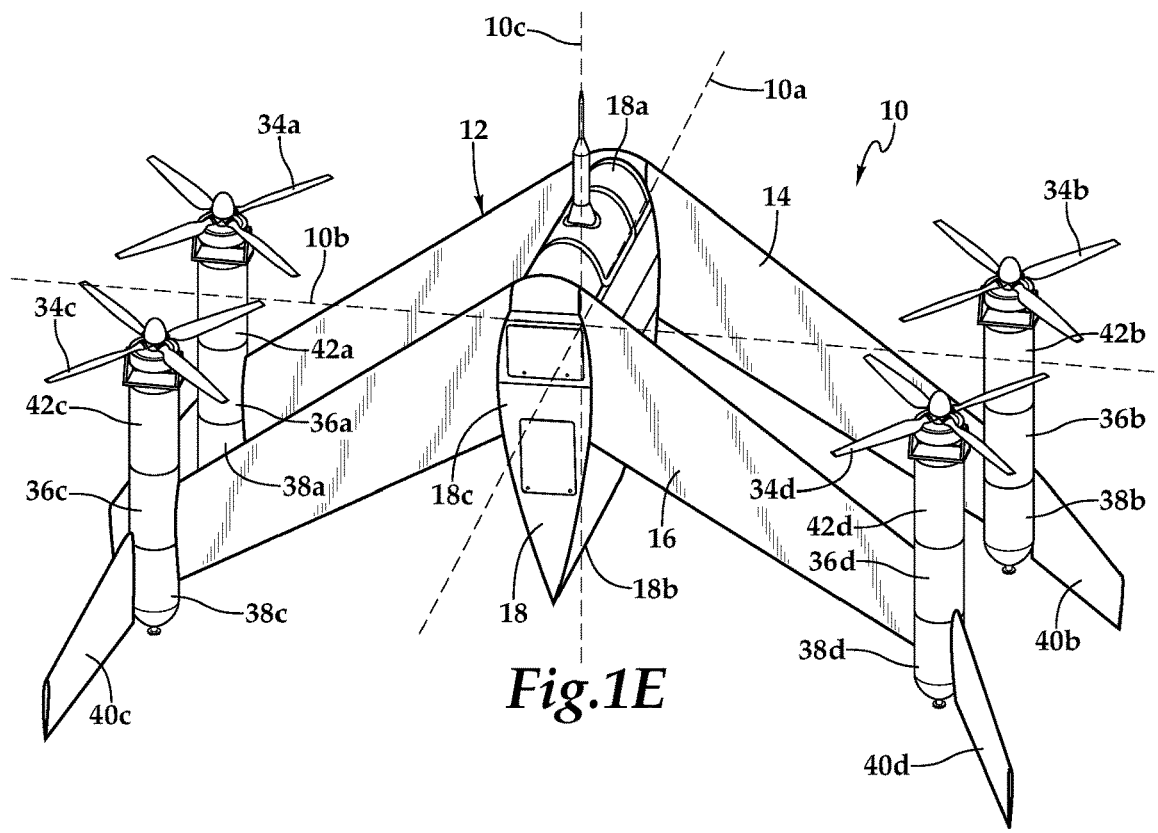
Figure 1G:
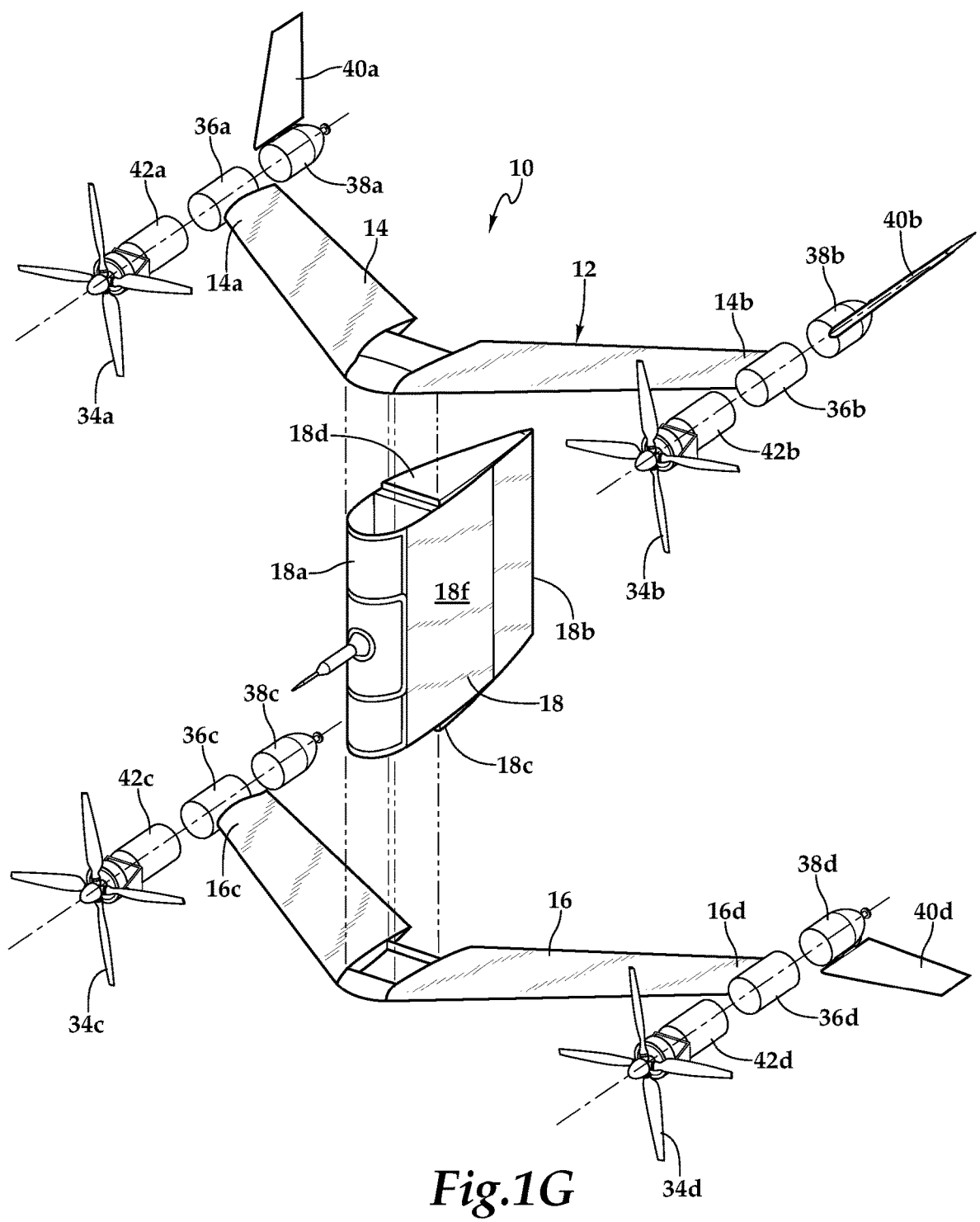

Referring to FIGS. 1A-1G in the drawings, various views of an autonomous cargo delivery aircraft 10 operable to transition between thrust-borne lift in a VTOL orientation and wing-borne lift in a biplane orientation are depicted. FIGS. 1A, 1C and 1E depict aircraft 10 in the VTOL orientation wherein the propulsion assemblies provide thrust-borne lift. FIGS. 1B, 1D and 1F depict aircraft 10 in the biplane orientation wherein the propulsion assemblies provide forward thrust with the forward airspeed of aircraft 10 providing wing-borne lift enabling aircraft 10 to have a high speed, high endurance and/or high efficiency forward flight mode. In each orientation, aircraft 10 has a longitudinal axis 10a that may also be referred to as the roll axis, a lateral axis 10b that may also be referred to as the pitch axis and a vertical axis 10c that may also be referred to as the yaw axis, as best seen in FIGS. 1E and 1F. When longitudinal axis 10a and lateral axis 10b are both in a horizontal plane and normal to the local vertical in the earth's reference frame, aircraft 10 has a level flight attitude.

In the illustrated embodiment, aircraft 10 has an airframe 12 including wings 14, 16 and fuselage 18. Wings 14, 16 each have an airfoil cross-section that generates lift responsive to the forward airspeed of aircraft 10 in the biplane orientation. Each of wings 14, 16 may be formed as single members or may be formed from multiple wing sections such as left and right sections. The outer skins for wings 14, 16 are preferably formed from high strength and lightweight materials such as fiberglass, carbon, plastic, metal or other suitable material or combination of materials. As best seen in FIG. 1F, in the biplane orientation of aircraft 10, wing 14 is an upper wing having a swept wing configuration and wing 16 is a lower wing having a swept wing configuration. In the illustrated embodiment, wings 14, 16 have a quarter chord sweep angle between twenty-five degrees and forty-five degrees such as a quarter chord sweep angle between thirty degrees and forty degrees or a quarter chord sweep angle of about thirty-five degrees. In the illustrated embodiment, the leading edge sweep angle is greater than the quarter chord sweep angle and the trailing edge sweep angle is less than the quarter chord sweep angle. As illustrated, the sweep angle progressively decreases from the leading edge to the trailing edge forming a tapered swept wing design. In other embodiments, the sweep angle may remain constant from the leading edge to the trailing edge forming a simple swept wing design, the leading edge may have a sweep angle and the trailing edge may not have a sweep angle forming a delta swept wing design or the leading edge may have a positive sweep angle and the trailing edge may have a negative sweep angle forming a trapezoidal swept wing design. In other embodiments, wings 14, 16 could have straight wing designs. In still other embodiments, wings 14, 16 could have other designs such as anhedral and/or dihedral wing designs. The specific design of wings 14, 16 including the sweep angle, the anhedral and/or dihedral orientation, the wingspan and the like will be determined based upon aerodynamic loads and performance requirements, as will be understood by those having ordinary skill in the art.

In the illustrated embodiment, wings 14, 16 are substantially parallel with each other with fuselage 18 extending substantially perpendicularly therebetween. Fuselage 18 has an aerodynamic shape with a leading edge 18a and a trailing edge 18b with a fuselage chord length extending therebetween, two sides 18c, 18d with a fuselage span length extending therebetween and a front 18e and back 18f with a fuselage thickness extending therebetween. The aerodynamic shape of fuselage 18 is configured to minimize drag during high speed forward flight. In addition, the fuselage span length is configured to minimize interference drag between wings 14, 16. For example, the fuselage span length may have a ratio to the wingspan of wings 14, 16 of between 1 to 2 and 1 to 3 such as a ratio of about 1 to 2.5. In other embodiments, the ratio of the fuselage span length to the wingspan may be either greater than 1 to 2 or less than 1 to 3. Fuselage 18 is preferably formed from high strength and lightweight materials such as fiberglass, carbon, plastic, metal or other suitable material or combination of materials. In the illustrated embodiment, wing 14 is coupled to fuselage 18 proximate side 18d and wing 16 is coupled to fuselage 18 at proximate to side 18c forming stiff connections therebetween. In the VTOL orientation, wing 16 is substantially forward of fuselage 18 and wing 14 is substantially aft of fuselage 18. In the biplane orientation, wing 16 is substantially below fuselage 18 and wing 14 is substantially above fuselage 18.

In the illustrated embodiment, fuselage 18 contains a power system 20 depicted as a plurality of batteries, as best seen in FIG. 1C. In the illustrated embodiment, batteries 20 may be rechargeable batteries or may be hot swappable batteries to enable a quick return to flight after the currently installed batteries have been discharged. As discussed herein, power system 20 supplies electrical power to flight control system 30, the distributed thrust array of aircraft 10 and other power consumers of aircraft 10 such that aircraft 10 may be referred to as an electric vertical takeoff and landing (eVTOL) aircraft. In other embodiments, some or all of power system 20 maybe located within wings 14, 16 and/or the nacelles of aircraft 10. In some embodiments, aircraft 10 may have a hybrid power system that includes one or more internal combustion engines and an electric generator. Preferably, the electric generator is used to charge the batteries. In other embodiments, the electric generator may provide power directly to a power management system and/or the power consumers of aircraft 10. In still other embodiments, aircraft 10 may use fuel cells as the electrical power source.

In the illustrated embodiment, fuselage 18 houses the flight control system 30 of aircraft 10. Flight control system 30 is preferably a redundant digital flight control system including multiple independent flight control computers. For example, the use of a triply redundant flight control system 30 improves the overall safety and reliability of aircraft 10 in the event of a failure in flight control system 30. Flight control system 30 preferably includes non-transitory computer readable storage media including a set of computer instructions executable by one or more processors for controlling the operation of aircraft 10. Flight control system 30 may be implemented on one or more general-purpose computers, special purpose computers or other machines with memory and processing capability. For example, flight control system 30 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 30 may be a microprocessor-based system operable to execute program code in the form of machine-executable instructions. In addition, flight control system 30 may be selectively connectable to other computer systems via a proprietary encrypted network, a public encrypted network, the Internet or other suitable communication network that may include both wired and wireless connections.

Wings 14, 16 contain a communication network that enables power system 20 and flight control system 30 to communicate with the distributed thrust array of aircraft 10. In the illustrated embodiment, aircraft 10 has a two-dimensional distributed thrust array that is coupled to airframe 12. As used herein, the term "two-dimensional thrust array" refers to a plurality of thrust generating elements that occupy a two-dimensional space in the form of a plane. A minimum of three thrust generating elements is required to form a "two-dimensional thrust array." A single aircraft may have more than one "two-dimensional thrust array" if multiple groups of at least three thrust generating elements each occupy separate two-dimensional spaces thus forming separate planes. As used herein, the term "distributed thrust array" refers to the use of multiple thrust generating elements each producing a portion of the total thrust output. The use of a "distributed thrust array" provides redundancy to the thrust generation capabilities of the aircraft including fault tolerance in the event of the loss of one of the thrust generating elements. A "distributed thrust array" can be used in conjunction with a "distributed power system" in which power to each of the thrust generating elements is supplied by a local or nacelle-based power element instead of a centralized power system.

The two-dimensional distributed thrust array of aircraft 10 includes a plurality of propulsion assemblies, individually denoted as 34a, 34b, 34c, 34d and collectively referred to as propulsion assemblies 34. In the illustrated embodiment, propulsion assemblies 34a, 34b are coupled to wing 14 and propulsion assemblies 34c, 34d are coupled to wing 16. More specifically, propulsion assembly 34a is coupled to an upper or forward end of nacelle body 36a that is fixably attached to wingtip 14a, propulsion assembly 34b is coupled to an upper or forward end of nacelle body 36b that is fixably attached to wingtip 14b, propulsion assembly 34c is coupled to an upper or forward end of nacelle body 36c that is fixably attached to wingtip 16c and propulsion assembly 34d is coupled to an upper or forward end of nacelle body 36d that is fixably attached to wingtip 16d. By positioning propulsion assemblies 34a, 34b, 34c, 34d at wingtip 14a, 14b, 16c, 16d, the thrust and torque generating elements are positioned at the maximum outboard distance from the center of gravity of aircraft 10 located at the intersection of axes 10a, 10b, 10c. The outboard locations of propulsion assemblies 34 provide dynamic stability to aircraft 10 in hover and a high dynamic response in the VTOL orientation of aircraft 10 enabling efficient and effective pitch, yaw and roll control by changing the thrust, thrust vector and/or torque output of certain propulsion assemblies 34 relative to other propulsion assemblies 34.

Even though the illustrated embodiment depicts four propulsion assemblies 34, the distributed thrust array of aircraft 10 could have other numbers of propulsion assemblies both greater than or less than four. Also, even though the illustrated embodiment depicts propulsion assemblies 34 in a wingtip mounted configuration, the distributed thrust array of aircraft 10 could have propulsion assemblies coupled to the wings in other configurations such as a mid-span configuration. In the illustrated embodiment, propulsion assemblies 34 are variable speed propulsion assemblies having fixed pitch rotor blades and thrust vectoring capability. Depending upon the implementation, propulsion assemblies 34 may have longitudinal thrust vectoring capability, lateral thrust vectoring capability or omnidirectional thrust vectoring capability. In other embodiments, propulsion assemblies 34 may be single speed propulsion assemblies, may have variable pitch rotor blades and/or may be non-thrust vectoring propulsion assemblies.

Propulsion assemblies 34 are independently attachable to and detachable from nacelle bodies 36 and are preferably standardized and/or interchangeable units such as line replaceable units or LRUs providing easy installation and removal from airframe 12. The use of line replaceable propulsion units is beneficial in maintenance situations if a fault is discovered with one of the propulsion assemblies. In this case, the faulty propulsion assembly 34 can be decoupled from airframe 12 by simple operations and another propulsion assembly 34 can then be attached to aircraft 10. In other embodiments, propulsion assemblies 34 may be integral with nacelle bodies 36.

Aircraft 10 has a damping landing gear system that includes landing gear assembly 38a coupled to a lower or aft end of nacelle body 36a, landing gear assembly 38b coupled to a lower or aft end of nacelle body 36b, landing gear assembly 38c coupled to a lower or aft end of nacelle body 36c and landing gear assembly 38d coupled to a lower or aft end of nacelle body 36d. By positioning landing gear assemblies 38a, 38b, 38c, 38d at wingtip 14a, 14b, 16c, 16d and by having a relatively low center of gravity, aircraft 10 maintains suitably high landing stability and tip-over stability. In the illustrated embodiment, each landing gear assembly 38 including a spring housing forming a spring chamber with a spring disposed therein and a plunger slidably coupled to the spring housing and movable between a compressed position and an extended position. The spring biases the plunger into the extended position during flight and the landing force compresses the plunger into the compressed position against the bias of the spring, thereby absorbing at least a portion of the landing force. In addition, the spring biasing force acting on the plunger when aircraft 10 is positioned on a landing surface generates a push-off effect to aid during takeoff maneuvers. In other embodiments, the landing gear assemblies may be passively operated pneumatic landing struts or actively operated telescoping landing struts. In still other embodiments, the landing gear assemblies may include wheels that enable aircraft 10 to taxi and perform other ground maneuvers. In such embodiments, the landing gear assemblies may provide a passive brake system or may include active brakes such as an electromechanical braking system or a manual braking system to facilitate parking during ground operations.

Aircraft 10 has a distributed array of aerodynamic control surfaces carried by landing gear assemblies 38. More specifically, elevon 40a is rotatably coupled to landing gear assembly 38a, elevon 40b is rotatably coupled to landing gear assembly 38b, elevon 40c is rotatably coupled to landing gear assembly 38c and elevon 40d is rotatably coupled to landing gear assembly 38d. In the illustrated embodiment, elevons 40 are pivoting aerosurfaces that are rotatable about respective elevon axes. In the illustrated embodiment, elevons 40a, 40b have a dihedral angle of about forty-five degrees relative to wing 14 and elevons 40c, 40d have an anhedral angle of about forty-five degrees relative to wing 16. In other embodiments, elevons 40 could have other angles relative to the wings such as angles less than or greater than forty-five degrees including being parallel to or perpendicular with the respective wings, such angles being adjustable during ground operation or during flight. The specific design of elevons 40 including the elevon angle relative to the wings, the elevon sweep angle, the elevon length and the like will be determined based upon aerodynamic loads and performance requirements, as will be understood by those having ordinary skill in the art. When operated collectively, elevons 40 serve as elevators to control the pitch or angle of attack of aircraft 10, in the biplane orientation. When operated differentially, elevons 40 serve as ailerons to control the roll or bank of aircraft 10, in the biplane orientation. In addition, elevons 40 may be used to generate yaw, roll and pitch control moments to complement other control authority mechanisms in hover or to provide standalone control authority in hover.

Land gear assemblies 38 are independently attachable to and detachable from nacelle bodies 36 and are preferably standardized and/or interchangeable units such as line replaceable units or LRUs providing easy installation and removal from airframe 12. The use of line replaceable land gear units is beneficial in maintenance situations if a fault is discovered with one of the land gear assemblies. In this case, the faulty land gear assembly 38 can be decoupled from airframe 12 by simple operations and another land gear assembly 38 can then be attached to aircraft 10. In other embodiments, land gear assemblies 38 may be integral with nacelle bodies 36.

In the illustrated embodiment, the outer housings of each group of a propulsion assembly 34, a nacelle body 36 and a land gear assembly 38 form a nacelle such as nacelle 42a, nacelle 42b, nacelle 42c and nacelle 42d. Each nacelle 42 houses an electronics node including sensor, controllers, actuators and other electronic components used to operate systems associated with the respective propulsion assembly 34 and a land gear assembly 38. For example, nacelle 42d houses a gimbal actuator 44d, an electronic speed controller 46d, a sensor array 48d and an elevon actuator 50d, as best seen in FIG. 1A. In other embodiments, each nacelle 42 may house one or more batteries for aircraft having a distributed power system for the distributed thrust array.

Each propulsion assembly 34 includes a rotor assembly that is coupled to an output drive of a respective electric motor that rotates the rotor assembly in a rotational plane to generate thrust for aircraft 10. For example, propulsion assembly 34d includes rotor assembly 52d and electric motor 54d. In the VTOL orientation of aircraft 10, the uppermost part of rotor assemblies 52 is below the apexes of wings 14, 16 and leading edge 18a of fuselage 18. Likewise, in the biplane orientation of aircraft 10, the forwardmost part of rotor assemblies 52 is aft of the apexes of wings 14, 16 and leading edge 18a of fuselage 18. In other embodiments, the rotors assemblies could extend beyond the apexes of wings 14, 16 and/or beyond leading edge 18a of fuselage 18. In the illustrated embodiment, rotor assemblies 52 each include four rotor blades having a fixed pitch. In other embodiments, the rotor assemblies could have other numbers of rotor blades including rotor assemblies having less than or more than four rotor blades. Alternatively or additionally, the rotor assemblies could have variable pitch rotor blades with collective and/or cyclic pitch control. As best seen in FIG. 1B, rotor assemblies 52a, 52d rotate in the counterclockwise direction and rotor assemblies 52b, 52c rotate in the clockwise direction when viewed from above, as indicated the motion arrows. In the illustrated embodiment, each rotor blade has a root to tip twist between thirty degrees and fifty degrees.

Together, each respective electric motor and rotor assembly forms a propulsion system. In the illustrated embodiment, each propulsion system has mounted to a nacelle 42 on a gimbal 56, such as gimbal 56d, that provides a two-axis tilting degree of freedom such that the electric motor and rotor assembly tilt together relative to the nacelle enabling propulsion assemblies 34 to have omnidirectional thrust vectoring capability. In the illustrated embodiment, the maximum angle of the thrust vector may be between 10 degrees and 30 degrees such as between 15 degrees and 25 degrees or about 20 degrees. Notably, using a 20-degree thrust vector yields a lateral component of thrust that is about 34 percent of total thrust. In other embodiments, the propulsion systems may have a single-axis tilting degree of freedom in which case, the propulsion assemblies could act as longitudinal and/or lateral thrust vectoring propulsion assemblies.

Aircraft 10 may be a manned or unmanned aircraft. Flight control system 30 may autonomously control some or all aspects of flight operations for aircraft 10. Flight control system 30 is also operable to communicate with remote systems, such as a ground station via a wireless communications protocol. The remote system may be operable to receive flight data from and provide commands to flight control system 30 to enable remote flight control over some or all aspects of flight operations for aircraft 10. The remote flight control and/or autonomous flight control may be augmented or supplanted by onboard pilot flight control during manned missions. Regardless of the input, aircraft 10 preferably utilizes a fly-by-wire system that transmits electronic signals from flight control system 30 to the actuators and controllers of aircraft systems to control the flight dynamics of aircraft 10 including controlling the movements of rotor assemblies 52, gimbals 56 and elevons 40. Flight control system 30 communicates with the controlled systems via a fly-by-wire communications network within airframe 12. In addition, flight control system 30 receives data from a plurality of sensors 58 such as one or more position sensors, attitude sensors, speed sensors, altitude sensors, heading sensors, environmental sensors, fuel sensors, temperature sensors, location sensors and the like to enhance flight control capabilities. Flight control system 30 receives sensor data from and sends flight command information to the electronics nodes such that each propulsion assembly 34 and each land gear assembly 40 may be individually and independently controlled and operated. For example, flight control system 30 is operable to individually and independently control the speed and the thrust vector of each propulsion assembly 34 and the position of each elevon 40.

Figure 2A:
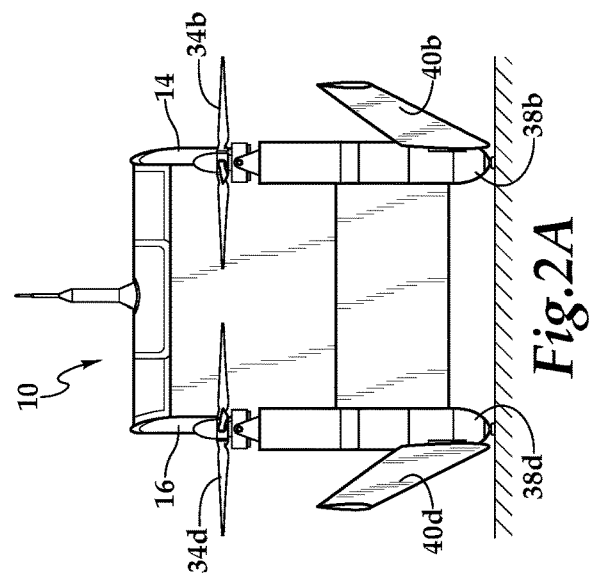

Referring additionally to FIGS. 2A-2I in the drawings, a sequential flight-operating scenario of aircraft 10 is depicted. As best seen in FIG. 2A, aircraft 10 is in a tailsitter position on a surface such as the ground or the deck of an aircraft carrier. In this tailsitter position, the weight of aircraft 10 has caused the plungers of landing gear assemblies 38 to compress the springs disposed therein such that the plungers are in retracted positions. In addition, elevons 40 are rotated to point in an upward direction to provide ground clearance. When aircraft 10 is ready for a mission, flight control system 30 commences operations providing flight commands to the various components of aircraft 10. Flight control system 30 may be operating responsive to autonomous flight control, remote flight control or a combination thereof. For example, it may be desirable to utilize remote flight control during certain maneuvers such as takeoff and landing but rely on autonomous flight control during hover, high speed forward flight and transitions between wing-borne flight and thrust-borne flight.

Figure 2B:
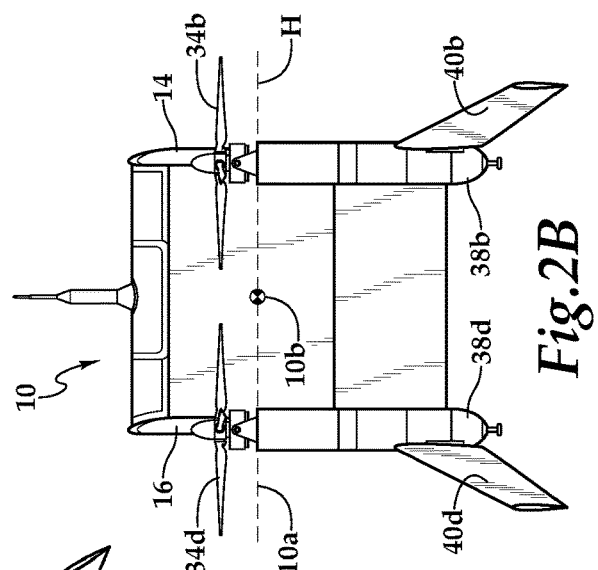

As best seen in FIG. 2B, aircraft 10 has performed a vertical takeoff and is engaged in thrust-borne lift in the VTOL orientation of aircraft 10. As illustrated, the rotor assemblies of propulsion assemblies 34 are each rotating in the same horizontal plane. As longitudinal axis 10a and lateral axis 10b (denoted as the target) are both in a horizontal plane H that is normal to the local vertical in the earth's reference frame, aircraft 10 has a level flight attitude. In the VTOL orientation, the plungers of landing gear assemblies 38 have moved to their extending positions responsive to the biasing force applied by the springs disposed therein. In addition, elevons 40 having been rotated to point in an downward direction which is the neutral configuration of elevons 40 in flight regimes, noting that rotation of one or more elevons 40 in the downwash of propulsion assemblies 34 may be used to provide hover stability as well as certain pitch, roll and yaw authority for aircraft 10. In the VTOL orientation, wing 16 is the forward wing and wing 14 is the aft wing. As discussed herein, flight control system 30 independently controls and operates each propulsion assembly 34 including independently controlling speed and thrust vector. During hover, flight control system 30 may utilize differential speed control and/or differential or collective thrust vectoring of propulsion assemblies 34 to provide hover stability for aircraft 10 and to provide pitch, roll, yaw and translation authority for aircraft 10.

Figure 2C:
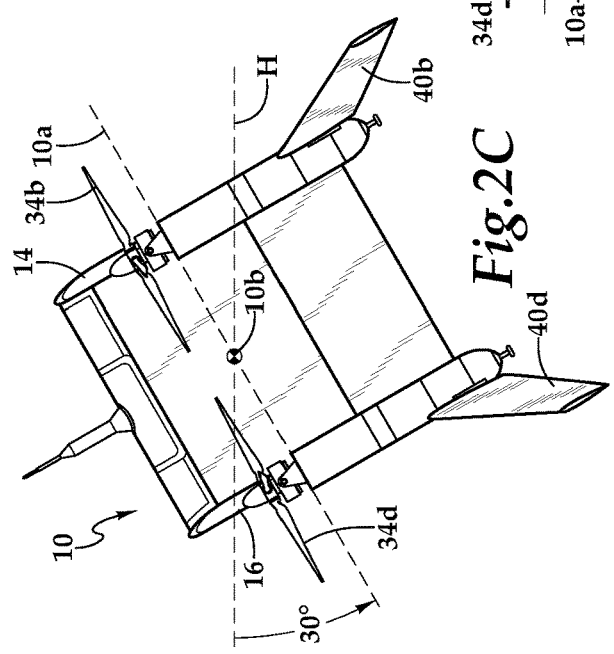
Figure 2D:
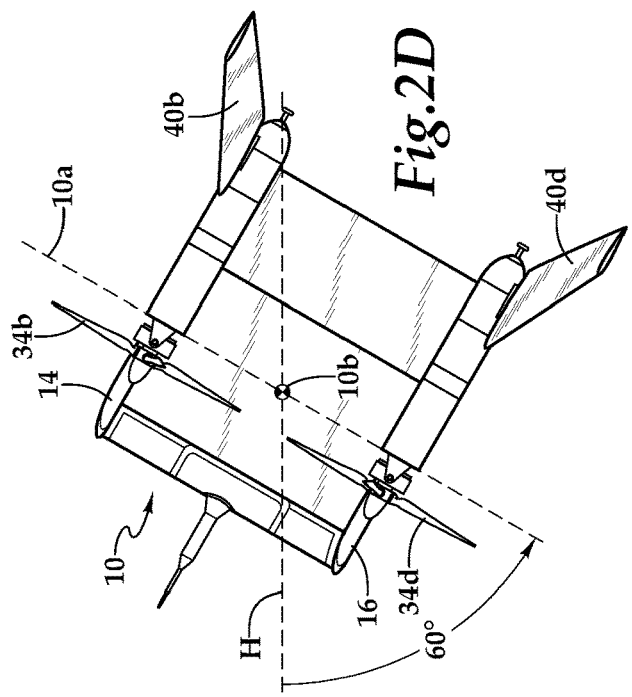

After vertical ascent to the desired elevation, aircraft 10 may begin the transition from thrust-borne lift to wing-borne lift. As best seen from the progression of FIGS. 2B-2E, aircraft 10 is operable to pitch down from the VTOL orientation toward the biplane orientation to enable high speed and/or long range forward flight. As seen in FIG. 2C, longitudinal axis 10a extends out of the horizontal plane H such that aircraft 10 has an inclined flight attitude of about thirty degrees pitch down. As seen in FIG. 2D, longitudinal axis 10a extends out of the horizontal plane H such that aircraft 10 has an inclined flight attitude of about sixty degrees pitch down. Flight control system 30 may achieve this operation through speed control of some or all of propulsion assemblies 34, thrust vectoring of some or all of propulsion assemblies 34, tilting of some or all of elevons 40 or any combination thereof.

Figure 2E:
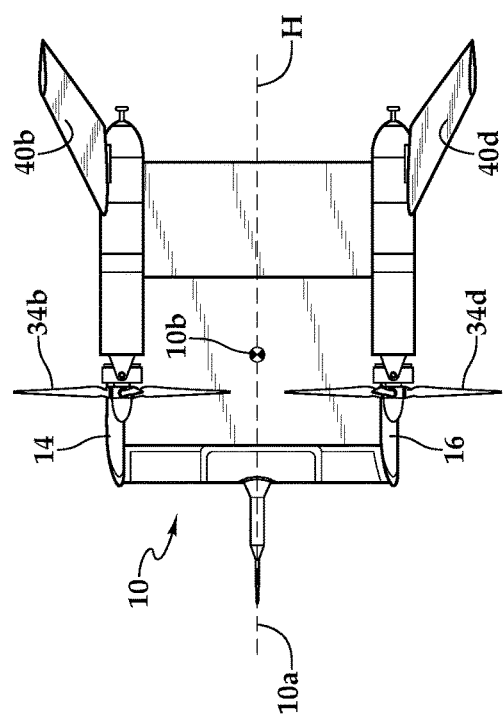

As best seen in FIG. 2E, aircraft 10 has completed the transition to the biplane orientation with the rotor assemblies of propulsion assemblies 34 each rotating in the same vertical plane. In the biplane orientation, wing 14 is the upper wing positioned above wing 16, which is the lower wing. By convention, longitudinal axis 10a has been reset to be in the horizontal plane H, which also includes lateral axis 10b, such that aircraft 10 has a level flight attitude in the biplane orientation. As forward flight with wing-borne lift requires significantly less power than VTOL flight with thrust-borne lift, the operating speed of some or all of the propulsion assemblies 34 may be reduced. In certain embodiments, some of the propulsion assemblies of aircraft 10 could be shut down during forward flight. In the biplane orientation, the independent control provided by flight control system 30 over each propulsion assembly 34 and each elevon 40 provides pitch, roll and yaw authority for aircraft 10.

Figure 2F:
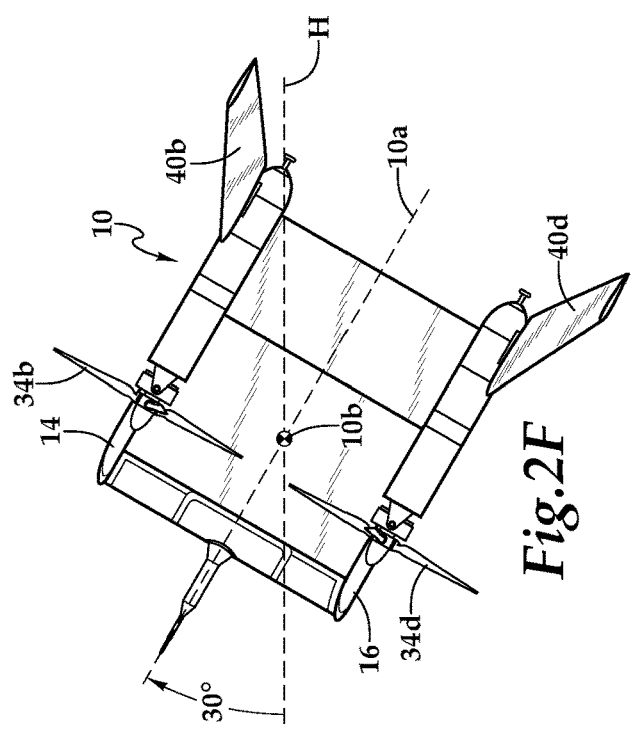

As aircraft 10 approaches the desired location, aircraft 10 may begin its transition from wing-borne lift to thrust-borne lift. As best seen from the progression of FIGS. 2E-2H, aircraft 10 is operable to pitch up from the biplane orientation to the VTOL orientation to enable, for example, a vertical landing operation. As seen in FIG. 2F, longitudinal axis 10a extends out of the horizontal plane H such that aircraft 10 has an inclined flight attitude of about thirty degrees pitch up. As seen in FIG. 2G, longitudinal axis 10a extends out of the horizontal plane H such that aircraft 10 has an inclined flight attitude of about sixty degrees pitch up. Flight control system 30 may achieve this operation through speed control of some or all of propulsion assemblies 34, thrust vectoring of some or all of propulsion assemblies 34, tilting of some or all of elevons 40 or any combination thereof. In FIG. 2H, aircraft 10 has completed the transition from the biplane orientation to the VTOL orientation and, by convention, longitudinal axis 10a has been reset to be in the horizontal plane H which also includes lateral axis 10b such that aircraft 10 has a level flight attitude in the VTOL orientation. Once aircraft 10 has completed the transition to the VTOL orientation, aircraft 10 may commence its vertical descent to a surface. During this vertical descent, elevons 40 are rotated to point in the upward direction to provide ground clearance. As aircraft 10 is landing, the weight of aircraft 10 causes the plungers of landing gear assemblies 38 to compress the springs disposed therein such that the plungers are in retracted positions, thereby providing damping of the landing impact. As best seen in FIG. 2I, aircraft 10 has landed in a tailsitter orientation at the desired location.

Figure 3:
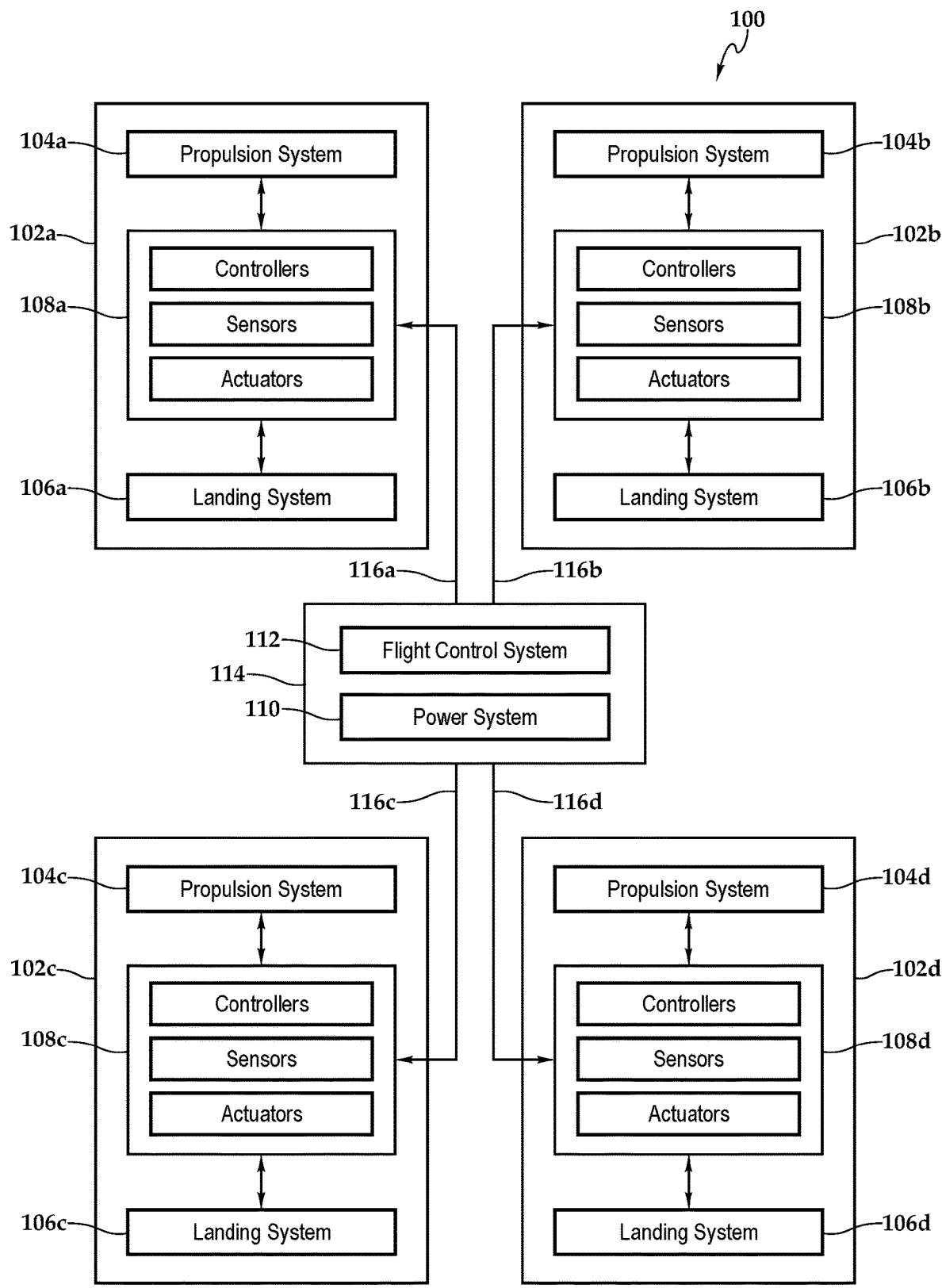
FIG. 3 is a systems diagram of an autonomous cargo delivery aircraft in accordance with embodiments of the present disclosure.

Referring next to FIG. 3, a systems diagram depicts one implementation of an aircraft 100 that is also representative of aircraft 10 discussed herein. Specifically, aircraft 100 includes four nacelle assemblies 102a, 102b, 102c, 102d that respectively support four propulsion systems 104a, 104b, 104c, 104d that form a two-dimensional thrust array of thrust vectoring propulsion assemblies and four landing systems 106a, 106b, 106c, 106d each of which includes a rotatable elevon as discussed herein. Disposed within respective nacelle assemblies 102a, 102b, 102c, 102d are electronics nodes 108a, 108b, 108c, 108d each of which includes one or more controllers, sensors, actuators and/or other electronic systems. In the illustrated embodiment, a power system 110, such as a plurality of batteries, and a flight control system 112 are disposed with fuselage 114. Power system 110 and flight control system 112 are operably associated with each of propulsion systems 104a, 104b, 104c, 104d and landing systems 106a, 106b, 106c, 106d and are communicably linked to electronic nodes 108a, 108b, 108c, 108d by a fly-by-wire communications network depicted as arrows 116a, 116b, 116c, 116d. Flight control system 112 receives sensor data from and sends commands to electronic nodes 108a, 108b, 108c, 108d to enable flight control system 112 to independently control each of propulsion systems 104a, 104b, 104c, 104d and landing systems 106a, 106b, 106c, 106d, as discussed herein.

Figure 4:
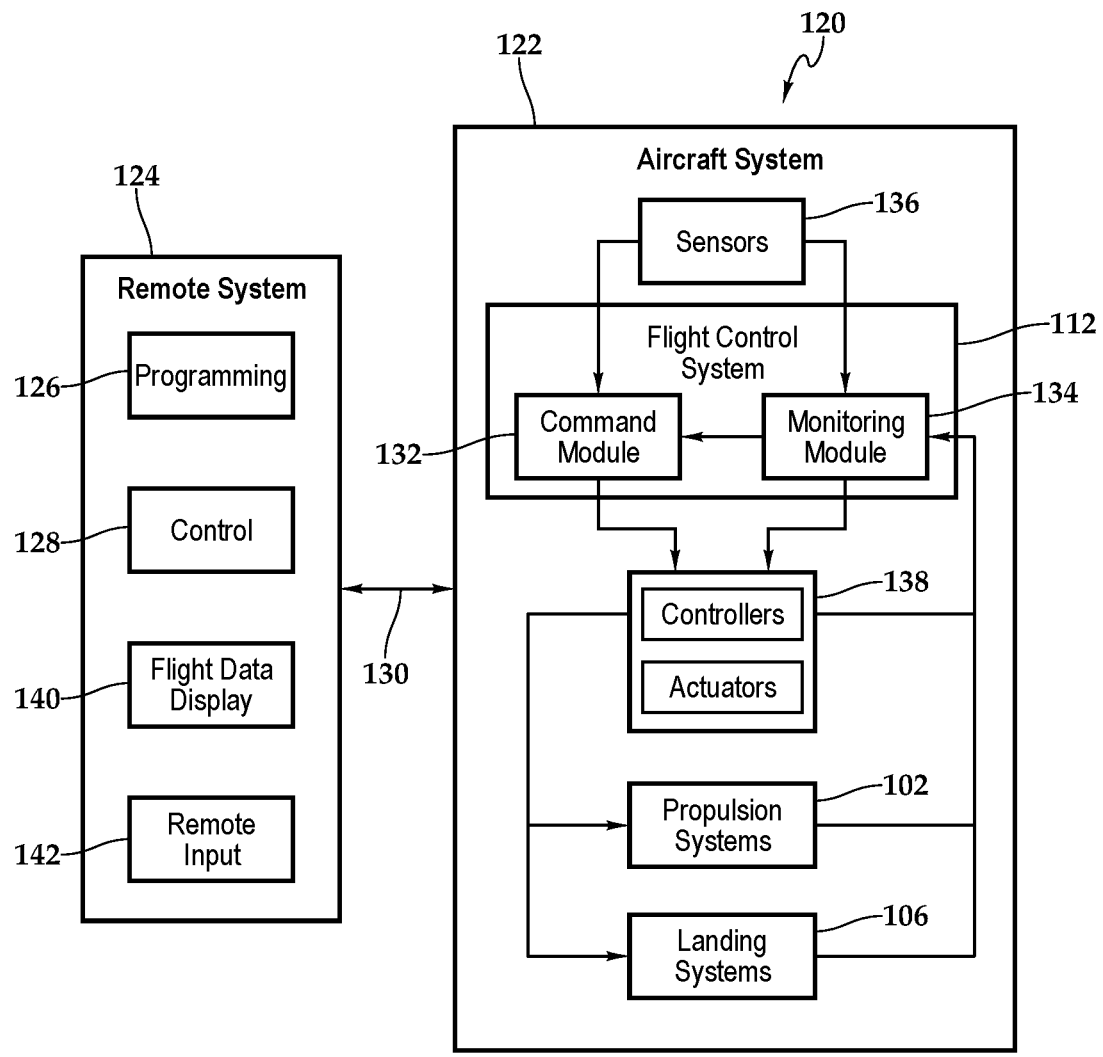
FIG. 4 is a control systems diagram of an autonomous cargo delivery aircraft in accordance with embodiments of the present disclosure.

Referring additionally to FIG. 4 in the drawings, a block diagram depicts a control system 120 operable for use with aircraft 100 or aircraft 10 of the present disclosure. In the illustrated embodiment, system 120 includes two primary computer based subsystems; namely, an aircraft system 122 and a remote system 124. In some implementations, remote system 124 includes a programming application 126 and a remote control application 128. Programming application 126 enables a user to provide a flight plan and mission information to aircraft 100 such that flight control system 112 may engage in autonomous control over aircraft 100. For example, programming application 126 may communicate with flight control system 112 over a wired or wireless communication channel 130 to provide a flight plan including, for example, a starting point, a trail of waypoints and an ending point such that flight control system 112 may use waypoint navigation during the mission. In addition, programming application 126 may provide one or more tasks to flight control system 112 for aircraft 100 to accomplish during the mission such as pickup and delivery of one or more packages. Following programming, aircraft 100 may operate autonomously responsive to commands generated by flight control system 112.

Flight control system 112 preferably includes a non-transitory computer readable storage medium including a set of computer instructions executable by a processor. Flight control system 112 may be a triply redundant system implemented on one or more general-purpose computers, special purpose computers or other machines with memory and processing capability. For example, flight control system 112 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 112 may be a microprocessor-based system operable to execute program code in the form of machine-executable instructions. In addition, flight control system 112 may be selectively connectable to other computer systems via a proprietary encrypted network, a public encrypted network, the Internet or other suitable communication network that may include both wired and wireless connections.

In the illustrated embodiment, flight control system 112 includes a command module 132 and a monitoring module 134. It is to be understood by those skilled in the art that these and other modules executed by flight control system 112 may be implemented in a variety of forms including hardware, software, firmware, special purpose processors and combinations thereof. Flight control system 112 receives input from a variety of sources including internal sources such as sensors 136, controllers/actuators 138, propulsion systems 102 and landing systems 106 and external sources such as remote system 124 as well as global positioning system satellites or other location positioning systems and the like. For example, as discussed herein, flight control system 112 may receive a flight plan for a mission from remote system 124. Thereafter, flight control system 112 may be operable to autonomously control all aspects of flight of an aircraft of the present disclosure.

For example, during the various operating modes of aircraft 100 including vertical takeoff and landing flight mode, hover flight mode, forward flight mode and transitions therebetween, command module 132 provides commands to controllers/actuators 138. These commands enable independent operation of each propulsion system 102 including rotor speed and thrust vector and each landing system 106 including elevon position. Flight control system 112 receives feedback from controllers/actuators 138, propulsion systems 102 and landing systems 106. This feedback is processed by monitoring module 134 that can supply correction data and other information to command module 132 and/or controllers/actuators 138. Sensors 136, such as an attitude and heading reference system (AHRS) with solid-state or microelectromechanical systems (MEMS) gyroscopes, accelerometers and magnetometers as well as other sensors including positioning sensors, speed sensors, environmental sensors, fuel sensors, temperature sensors, location sensors and the like also provide information to flight control system 112 to further enhance autonomous control capabilities.

Some or all of the autonomous control capability of flight control system 112 can be augmented or supplanted by remote flight control from, for example, remote system 124. Remote system 124 may include one or computing systems that may be implemented on general-purpose computers, special purpose computers or other machines with memory and processing capability. For example, the computing systems may include one or more memory storage modules including, but is not limited to, internal storage memory such as random access memory, non-volatile memory such as read only memory, removable memory such as magnetic storage memory, optical storage memory, solid-state storage memory or other suitable memory storage entity. The computing systems may be microprocessor-based systems operable to execute program code in the form of machine-executable instructions. In addition, the computing systems may be connected to other computer systems via a proprietary encrypted network, a public encrypted network, the Internet or other suitable communication network that may include both wired and wireless connections. The communication network may be a local area network, a wide area network, the Internet, or any other type of network that couples a plurality of computers to enable various modes of communication via network messages using suitable communication techniques, such as transmission control protocol/internet protocol, file transfer protocol, hypertext transfer protocol, internet protocol security protocol, point-to-point tunneling protocol, secure sockets layer protocol or other suitable protocol. Remote system 124 communicates with flight control system 112 via a communication link 130 that may include both wired and wireless connections.

While operating remote control application 128, remote system 124 is configured to display information relating to one or more aircraft of the present disclosure on one or more flight data display devices 140. Display devices 140 may be configured in any suitable form, including, for example, liquid crystal displays, light emitting diode displays or any suitable type of display. Remote system 124 may also include audio output and input devices such as a microphone, speakers and/or an audio port allowing an operator to communicate with other operators or a base station. The display device 140 may also serve as a remote input device 142 if a touch screen display implementation is used, however, other remote input devices, such as a keyboard or joystick, may alternatively be used to allow an operator to provide control commands to an aircraft being operated responsive to remote control.

Figure 5B:
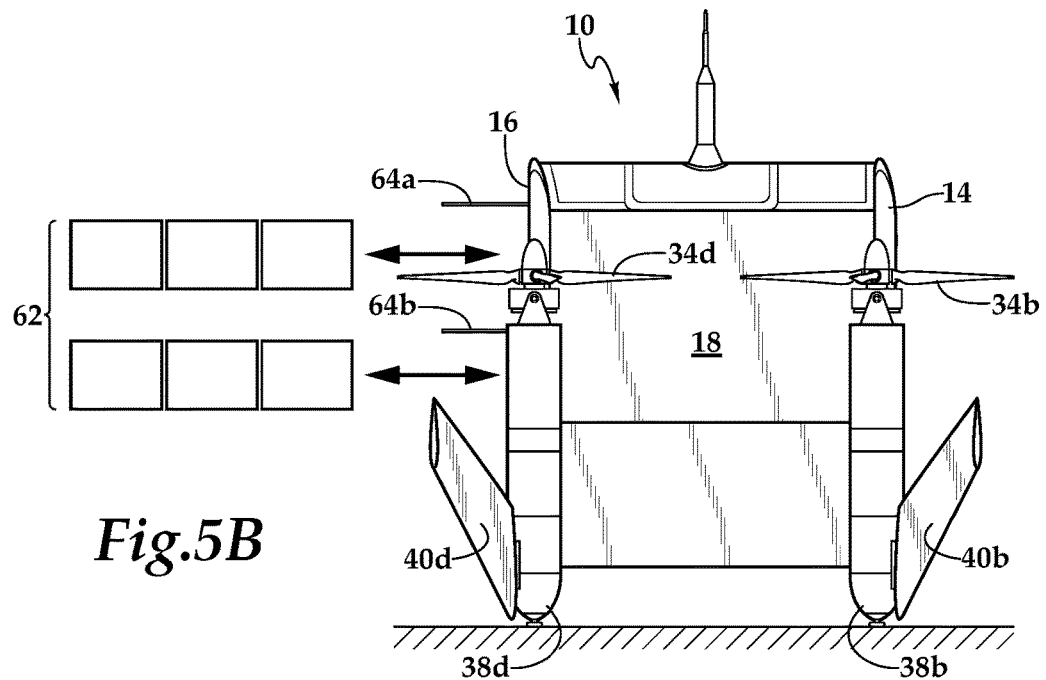
FIGS. 5A-5D are schematic illustrations depicting certain cargo loading and unloading characteristics of an autonomous cargo delivery aircraft in accordance with embodiments of the present disclosure.
Figure 5A:
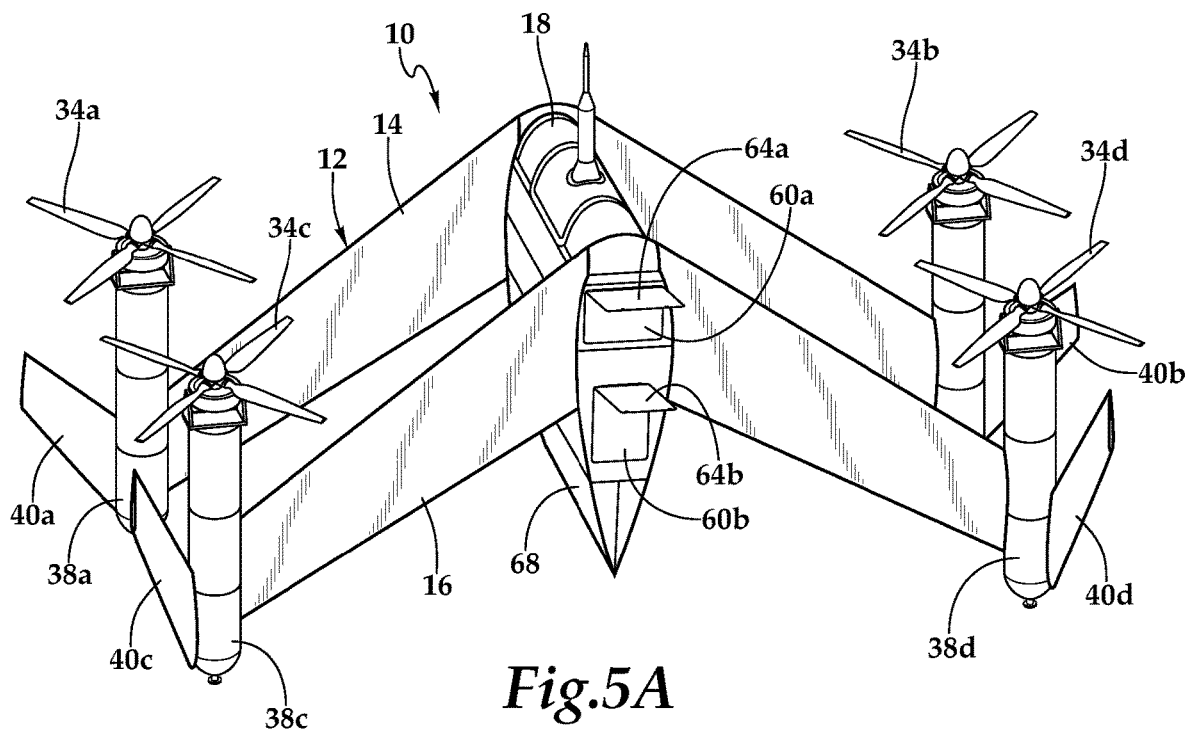
Figure 5D:
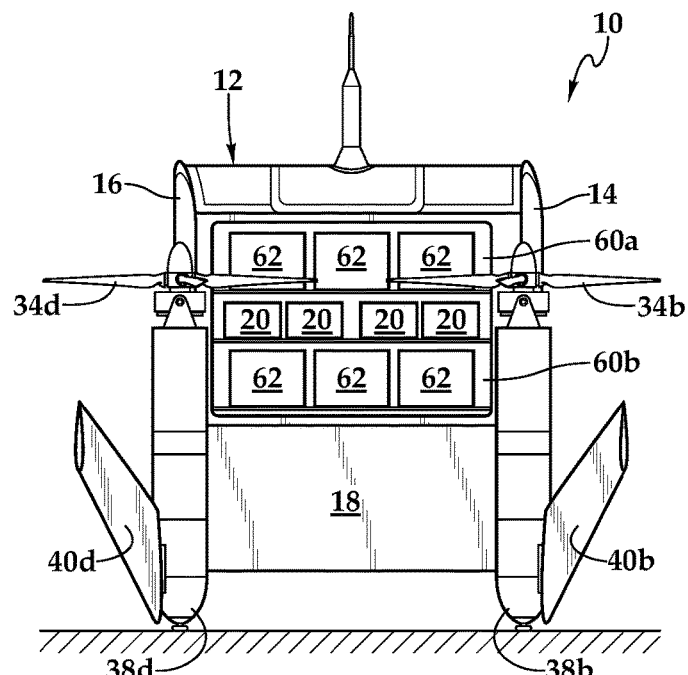

Aircraft 10 may operate in many roles including military, commercial, scientific and recreational roles, to name a few. For example, as best seen in FIGS. 5A-5D, aircraft 10 may be a logistics support aircraft configured for cargo transportation such as performing autonomous package delivery operations between a warehouse and customers. In the illustrated implementation, aircraft 10 includes an upper cargo bay 60a and a lower cargo bay 60b. Upper and lower cargo bays 60a, 60b extend in the spanwise direction of fuselage 18, as best seen in FIG. 5D in which a back access panel has been removed from fuselage 18 exposing batteries 20 and a plurality of packages 62. Packages 62 may be loaded into and unloaded from upper cargo bay 60a by opening a side door 64a, as best in FIGS. 5A-5B. Likewise, packages 62 may be loaded into and unloaded from lower cargo bay 60b by opening a side door 64b, as best in FIGS. 5A-5B. As illustrated, any number of packages 62 may be loaded into cargo bays 60a, 60b and transported by aircraft 10 from a departure location to one or more destination locations to accomplish one or more delivery operations. Once all packages 62 have been delivered, aircraft 10 may return to the departure location or other location to acquire more packages 62 for delivery. Preferably, packages 62 are fixably coupled within fuselage 18 by suitable means to prevent relative movement therebetween, thus protecting the contents of packages 62 from damage and maintaining a stable center of mass for aircraft 10.

Even though fuselage 18 has been depicted and described as having two cargo bays 60a, 60b and two side doors 64a, 64b, it should be understood by those having ordinary skill in the art that a fuselage of the present disclosure could have any number of cargo bays and/or any number of side doors both greater than or less than two without departing from the principles of the present disclosure. Also, even though fuselage 18 has been depicted and described as having side doors 64a, 64b on only one side of fuselage 18, it should be understood by those having ordinary skill in the art that a fuselage of the present disclosure could have one or more side doors on each side of the fuselage such that access to each of the cargo bays is available from either side of the aircraft or a fuselage of the present disclosure could have one or more side doors on each side of the fuselage that provide access to only certain of the cargo bays from either side of the aircraft without departing from the principles of the present disclosure.

Figure 5C:
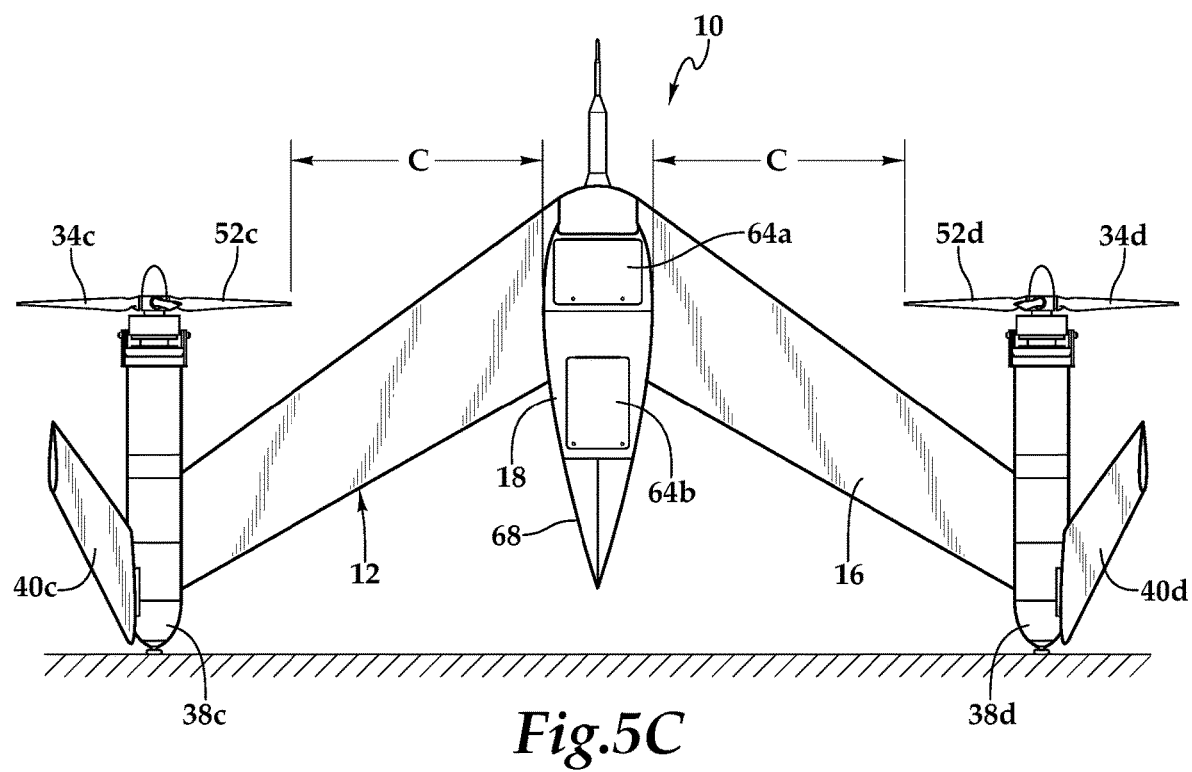

In the illustrated embodiment, fuselage 18 and side doors 64a, 64b are configured to provide access to upper and lower cargo bays 60a, 60b from the exterior of aircraft 10 while providing a predetermined clearance C relative to propulsion assemblies 34c, 34d and in particular to rotor assemblies 52c, 52d, as best seen in FIG. 5C. This configuration allows for ground personnel or automated loading and unloading equipment to safely approach aircraft 10 and easily access cargo bays 60a, 60b via side doors 64a, 64b without interference with propulsion assemblies 34c, 34d or other parts of aircraft 10. In the illustrated embodiment, the predetermined clearance C is between two feet and four feet such as about three feet. In other embodiments, the predetermined clearance C could have other dimensions including predetermined clearances of less than two feet or greater than four feet.

Figure 6B:
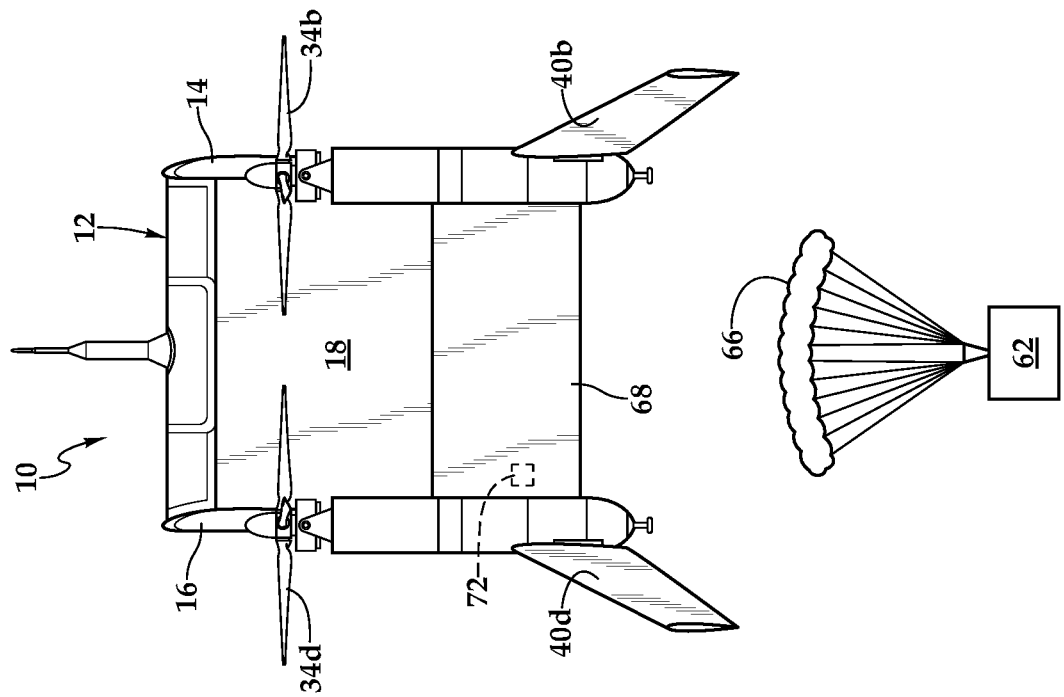
FIGS. 6A-6B are schematic illustrations depicting certain cargo drop characteristics of an autonomous cargo delivery aircraft in accordance with embodiments of the present disclosure.
Figure 6A:
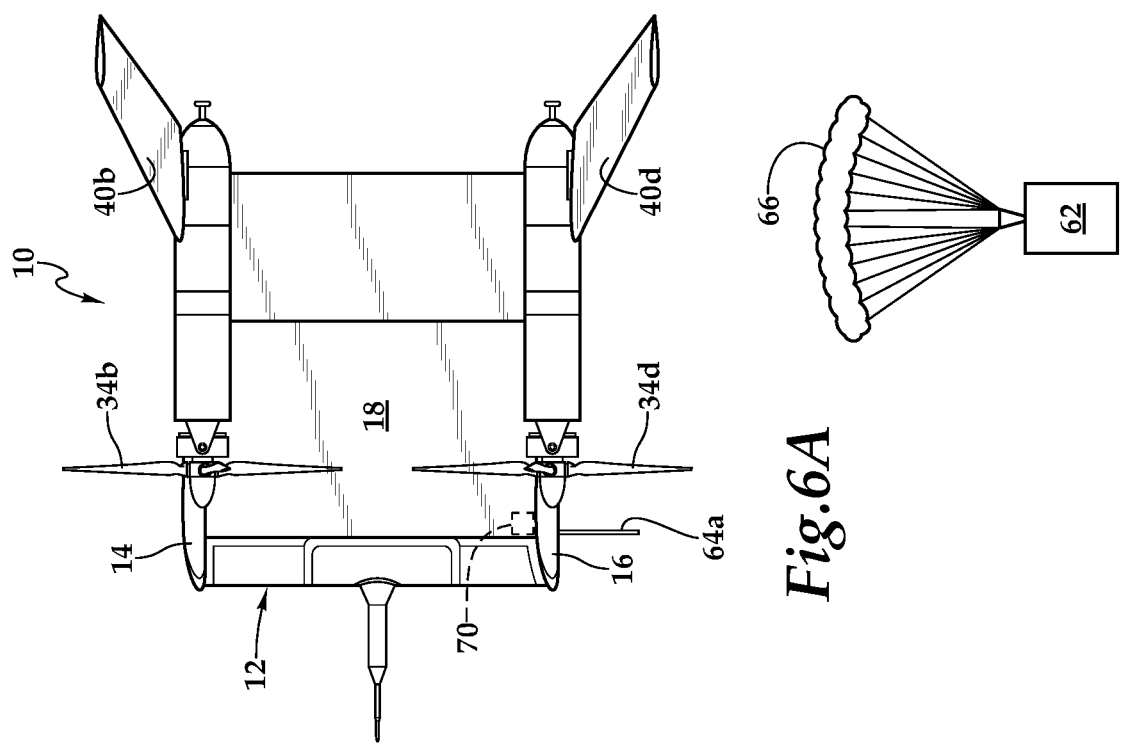

In addition to loading and unloading aircraft 10 while positioned on a surface, aircraft 10 of the present disclosure has package release capabilities in association with cargo transportation. This package release capability allows aircraft 10 to deliver cargo to a desired location following transportation thereof without the requirement for landing by opening any one of the side doors on the lower side of aircraft 10 during flight and releasing the desired package or packages. For example, as best seen in FIG. 6A, upon reaching the desired location in a package delivery operation, flight control system 30 provides commands for accomplishing the package release including commands to a side door actuator 70 to open side door 64a during forward flight. An automated package drop system then releases the desired package 62 from cargo bay 60a. In the illustrated embodiment, package 62 is supported by a parachute 66 during its descent to the ground or other target location. Thereafter, side door actuator 70 causes side door 64a to close. In another example, as best seen in FIG. 6B, upon reaching the desired location in a package delivery operation, aircraft 10 transitions from the biplane orientation to the VTOL orientation and engages in hover operations above the target location. Flight control system 30 then provide commands for accomplishing a package release including commands to a trailing edge door actuator 72 to open a trailing edge door 68 such as a clamshell type door. An automated package drop system then releases the desired package 62 from one of cargo bays 60a, 60b. In the illustrated embodiment, package 62 is supported by a parachute 66 during its descent to the ground or other target location. Thereafter, trailing edge door actuator 72 causes trailing edge door 68 to close and aircraft 10 transitions from the VTOL orientation to the biplane orientation for high speed, high endurance and/or high efficiency flight to the next package release location.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An aircraft operable to transition between thrust-borne lift in a VTOL orientation and wing-borne lift in a biplane orientation, the aircraft comprising:
    a fuselage having an aerodynamic shape with a leading edge and a trailing edge separated by a chord length and first and second sides separated by a span length, the fuselage having a first cargo bay;
    a first wing coupled to the fuselage proximate the first side and a second wing coupled to the fuselage proximate the second side, such that the span length of the fuselage extends substantially perpendicularly between the first and second wings;
    a distributed thrust array including a first pair of propulsion assemblies coupled to the first wing and a second pair of propulsion assemblies coupled to the second wing; and
    a flight control system operably associated with the distributed thrust array and configured to independently control each of the propulsion assemblies;
    wherein, the first side of the fuselage includes a first door that is disposed between the propulsion assemblies of the first pair of propulsion assemblies, the first door configured to provide access to the first cargo bay from an exterior of the aircraft with a predetermined clearance relative to each of the propulsion assemblies of the first pair of propulsion assemblies.

2. The aircraft as recited in claim 1 wherein, in the VTOL orientation, the first wing is substantially forward of the fuselage and the second wing is substantially aft of the fuselage; and
    wherein, in the biplane orientation, the first wing is substantially below the fuselage and the second wing is substantially above the fuselage.

3. The aircraft as recited in claim 1 wherein the first and second wings are substantially parallel to each other.

4. The aircraft as recited in claim 1 wherein the first and second wings are swept wings.

5. The aircraft as recited in claim 4 wherein each of the first and second wings has an apex proximate the leading edge of the fuselage.

6. The aircraft as recited in claim 5 wherein, in the VTOL orientation, the propulsion assemblies are below the apexes of the first and second wings; and
    wherein, in the biplane orientation, the propulsion assemblies are aft of the apexes of the first and second wings.

7. The aircraft as recited in claim 1 wherein, in the VTOL orientation, the propulsion assemblies are below the leading edge of the fuselage; and
    wherein, in the biplane orientation, the propulsion assemblies are aft of the leading edge of the fuselage.

8. The aircraft as recited in claim 1 wherein the fuselage has a second cargo bay and wherein the first side of the fuselage includes a second door configured to provide access to the second cargo bay from the exterior of the aircraft with the predetermined clearance relative to each of the propulsion assemblies of the first pair of propulsion assemblies.

9. The aircraft as recited in claim 1 further comprising a power system disposed within the fuselage.

10. The aircraft as recited in claim 9 wherein the power system further comprises a plurality of batteries.

11. The aircraft as recited in claim 1 wherein each of the propulsion assemblies further comprises an electric motor and a rotor assembly coupled to the electric motor.

12. The aircraft as recited in claim 1 wherein the distributed thrust array further comprises a two-dimensional thrust array.

13. The aircraft as recited in claim 1 wherein the flight control system is configured for autonomous flight control.

14. The aircraft as recited in claim 1 wherein the flight control system is configured for unmanned cargo delivery.

15. The aircraft as recited in claim 1 wherein, in the biplane orientation, the first door is configured for cargo drop operations.

16. The aircraft as recited in claim 15 further comprising a first door actuator configured to receive commands from the flight control system and operate the first door between open and closed positions during the cargo drop operations.

17. The aircraft as recited in claim 1 wherein the fuselage includes a trailing edge door; and wherein, in the VTOL orientation, the trailing edge door is configured for cargo drop operations.

18. The aircraft as recited in claim 17 further comprising a trailing edge door actuator configured to receive commands from the flight control system and operate the trailing edge door between open and closed positions during the cargo drop operations.

19. An autonomous cargo delivery aircraft operable to transition between thrust-borne lift in a VTOL orientation and wing-borne lift in a biplane orientation, the aircraft comprising:
- a fuselage having an aerodynamic shape with a leading edge and a trailing edge separated by a chord length and first and second sides separated by a span length, the fuselage having a first cargo bay;
- a first swept wing coupled to the fuselage proximate the first side and a second swept wing coupled to the fuselage proximate the second side, such that the span length of the fuselage extends substantially perpendicularly between the first and second swept wings; with apexes of the first and second swept wings proximate the leading edge of the fuselage;
- a distributed thrust array including a first pair of propulsion assemblies coupled to the first swept wing and a second pair of propulsion assemblies coupled to the second swept wing; and
- a flight control system operably associated with the distributed thrust array and configured to independently control each of the propulsion assemblies;

wherein, the first side of the fuselage includes a first door that is disposed between the propulsion assemblies of the first pair of propulsion assemblies, the first door configured to provide access to the first cargo bay from an exterior of the aircraft with a predetermined clearance relative to each of the propulsion assemblies of the first pair of propulsion assemblies;

wherein, in the VTOL orientation, the first swept wing is substantially forward of the fuselage, the second swept wing is substantially aft of the fuselage and the propulsion assemblies are below the leading edge of the fuselage and below the apexes of the first and second swept wings; and wherein, in the biplane orientation, the first swept wing is substantially below the fuselage, the second swept wing is substantially above the fuselage, the propulsion assemblies are aft of the leading edge of the fuselage and aft of the apexes of the first and second swept wings and the first door is configured for cargo drop operations with the first side of the fuselage being a lower side of the fuselage.

20. The aircraft as recited in claim 19 further comprising a first door actuator configured to receive commands from the flight control system and operate the first door between open and closed positions during the cargo drop operations.

* * * * *